US011582590B2

(12) United States Patent
Cheraghi et al.

(10) Patent No.: US 11,582,590 B2
(45) Date of Patent: Feb. 14, 2023

(54) VEHICLE COMMUNICATIONS SYSTEM WITH VEHICLE CONTROLLER AND SET OF WIRELESS RELAY DEVICES

(71) Applicant: QUALCOMM Incorporated, San Diego, CA (US)

(72) Inventors: Parisa Cheraghi, Cambridge (GB); Gene Wesley Marsh, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 17/122,928

(22) Filed: Dec. 15, 2020

(65) Prior Publication Data

US 2022/0191662 A1 Jun. 16, 2022

(51) Int. Cl.
| | |
|---|---|
| *H04W 4/48* | (2018.01) |
| *G08G 1/01* | (2006.01) |
| *H04W 24/10* | (2009.01) |
| *H04W 88/04* | (2009.01) |
| *H04W 92/18* | (2009.01) |

(52) U.S. Cl.
CPC ............ *H04W 4/48* (2018.02); *G08G 1/0125* (2013.01); *H04W 24/10* (2013.01); *H04W 88/04* (2013.01); *H04W 92/18* (2013.01)

(58) Field of Classification Search
CPC ....... H04W 4/48; H04W 88/04; H04W 24/10; H04W 92/18; G08G 1/0125
See application file for complete search history.

(56) References Cited

U.S. PATENT DOCUMENTS

| | | | | |
|---|---|---|---|---|
| 2008/0198799 | A1* | 8/2008 | Yamasaki | H04W 16/24 370/329 |
| 2010/0234071 | A1* | 9/2010 | Shabtay | H04B 7/155 455/562.1 |
| 2015/0003318 | A1 | 1/2015 | Meyer et al. | |
| 2015/0025704 | A1* | 1/2015 | Horihata | H04L 12/40039 700/297 |
| 2015/0234690 | A1* | 8/2015 | Ito | G06F 13/4221 719/313 |
| 2018/0199227 | A1* | 7/2018 | Huang | H04W 36/06 |
| 2018/0227728 | A1* | 8/2018 | Kim | H04B 7/06 |
| 2018/0343639 | A1* | 11/2018 | Zheng | H04W 48/18 |
| 2019/0173952 | A1* | 6/2019 | Tauchi | H04L 67/12 |
| 2019/0349135 | A1* | 11/2019 | Xu | H04L 1/188 |

(Continued)

OTHER PUBLICATIONS

International Search Report and Written Opinion—PCT/US2021/072728—ISA/EPO—dated Mar. 15, 2022.

*Primary Examiner* — Ajay Cattungal
(74) *Attorney, Agent, or Firm* — Muncy, Geissler Olds & Lowe, P.C./Qualcomm Incorporated

(57) ABSTRACT

Disclosed are techniques for wireless communication. In an aspect, a vehicle communications system of a vehicle comprises a vehicle controller with a wireless communications interface capable of providing wireless coverage in a plurality of vehicle regions, and a set of relay devices that are each communicatively coupled to the vehicle controller and are each capable of providing wireless coverage in at least one of the plurality of vehicle regions. In a further aspect, the vehicle controller transitions between first and second modes of communication based in part upon a traffic condition.

29 Claims, 18 Drawing Sheets

(56) References Cited

U.S. PATENT DOCUMENTS

| | | | |
|---|---|---|---|
| 2020/0111346 A1* | 4/2020 | Kodama | G07C 5/008 |
| 2020/0144706 A1* | 5/2020 | Sudo | H04N 5/64 |
| 2020/0145989 A1* | 5/2020 | Luo | H04L 5/0048 |
| 2020/0178349 A1* | 6/2020 | Edwards | H04W 88/04 |
| 2020/0221284 A1* | 7/2020 | Liu | H04W 24/10 |
| 2020/0274729 A1* | 8/2020 | Takada | H04L 9/3242 |
| 2020/0324664 A1* | 10/2020 | Kanzaki | B60L 58/12 |
| 2020/0349783 A1* | 11/2020 | Kelly | H04B 17/318 |
| 2020/0413329 A1* | 12/2020 | Nishizaki | H04W 48/20 |
| 2021/0399942 A1* | 12/2021 | Yasunori | H04B 7/14 |

* cited by examiner

VEHICLE COMMUNICATIONS SYSTEM WITH VEHICLE CONTROLLER AND SET OF WIRELESS RELAY DEVICES

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Some current vehicles are equipped with a large numbers of sensors, cameras and other devices which allows them to detect and sense the environment and objects around them and enable an autonomous driving experience. Connecting these devices has many advantages, but achieving coexistence with other vehicles within close proximity (e.g., inter-vehicle interference) and/or handling harsh channel conditions within the vehicle (e.g., rich multipath, engine noise, high pathloss, severe scattering in a limited space and often non-line of sight channels, etc.) may be difficult. Given the challenging channel condition and high path loss (e.g., as high as 84 dB average path loss depending on the location of receiver and transmitter), the transmission power required to send the data successfully to the destination, which is predominantly the central processing unit (or vehicle controller) can be quite high. However, this high transmission power can be problematic for inter-vehicle interference, especially if the vehicles are driving or located very close to each other.

Aspects of the disclosure are thereby directed to a vehicle communications system that comprises both a vehicle controller including a wireless communications interface capable of providing wireless coverage in a plurality of vehicle regions. The vehicle communications system further includes a set of relay devices that are each communicatively coupled (e.g., via a wired link or wireless link) to the vehicle controller and are each capable of providing wireless coverage in at least one of the plurality of vehicle regions. Hence, the set of relay devices is capable of providing wireless coverage that overlaps with some or all of the wireless coverage that the vehicle controller is capable of providing direct wireless coverage. As will be described below in more detail, in some designs, the set of relay devices may be opportunistically activated or deactivated based on a traffic condition (e.g., interference caused by a neighboring interference source and/or detection of the neighboring interference source). Such aspects may provide various technical advantages, such as reducing interference between a vehicle and a nearby interference source.

In some implementations, a vehicle communications system of a vehicle includes a vehicle controller comprising a wireless communications interface capable of providing wireless coverage in a plurality of vehicle regions; and a set of relay devices that are each communicatively coupled to the vehicle controller and are each capable of providing wireless coverage in at least one of the plurality of vehicle regions.

In some implementations, a method of operating a vehicle controller of a vehicle communications system of a first vehicle includes monitoring a traffic condition associated with the first vehicle; and transitioning between a first mode of operation and a second mode of operation based on the monitored traffic condition, wherein, during the first mode of operation, a set of relay devices is at least partially activated so as to provide wireless coverage some or all of a plurality of vehicle regions while a wireless communications interface of the vehicle controller is at least partially deactivated so as to provide wireless coverage in less than all of the plurality of vehicle regions; and wherein, during the second mode of operation, the set of relay devices is deactivated while the wireless communications interface of the vehicle controller is activated so as to provide wireless coverage in the plurality of vehicle regions.

In some implementations, a vehicle controller of a vehicle communications system of a vehicle includes means for monitoring a traffic condition associated with the vehicle; and means for transitioning between a first mode of operation and a second mode of operation based on the monitored traffic condition, wherein, during the first mode of operation, a set of relay devices is at least partially activated so as to provide wireless coverage some or all of a plurality of vehicle regions while a wireless communications interface of the vehicle controller is at least partially deactivated so as to provide wireless coverage in less than all of the plurality of vehicle regions; and wherein, during the second mode of operation, the set of relay devices is deactivated while the wireless communications interface of the vehicle controller is activated so as to provide wireless coverage in the plurality of vehicle regions.

In some implementations, a non-transitory computer-readable medium comprising instructions stored thereon which cause a vehicle controller of a vehicle communications system of a vehicle to: monitor a traffic condition associated with the vehicle; and transition between a first mode of operation and a second mode of operation based on the monitored traffic condition, wherein, during the first mode of operation, a set of relay devices is at least partially activated so as to provide wireless coverage some or all of a plurality of vehicle regions while a wireless communications interface of the vehicle controller is at least partially deactivated so as to provide wireless coverage in less than all of the plurality of vehicle regions; and wherein, during the second mode of operation, the set of relay devices is deactivated while the wireless communications interface of the vehicle controller is activated so as to provide wireless coverage in the plurality of vehicle regions.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
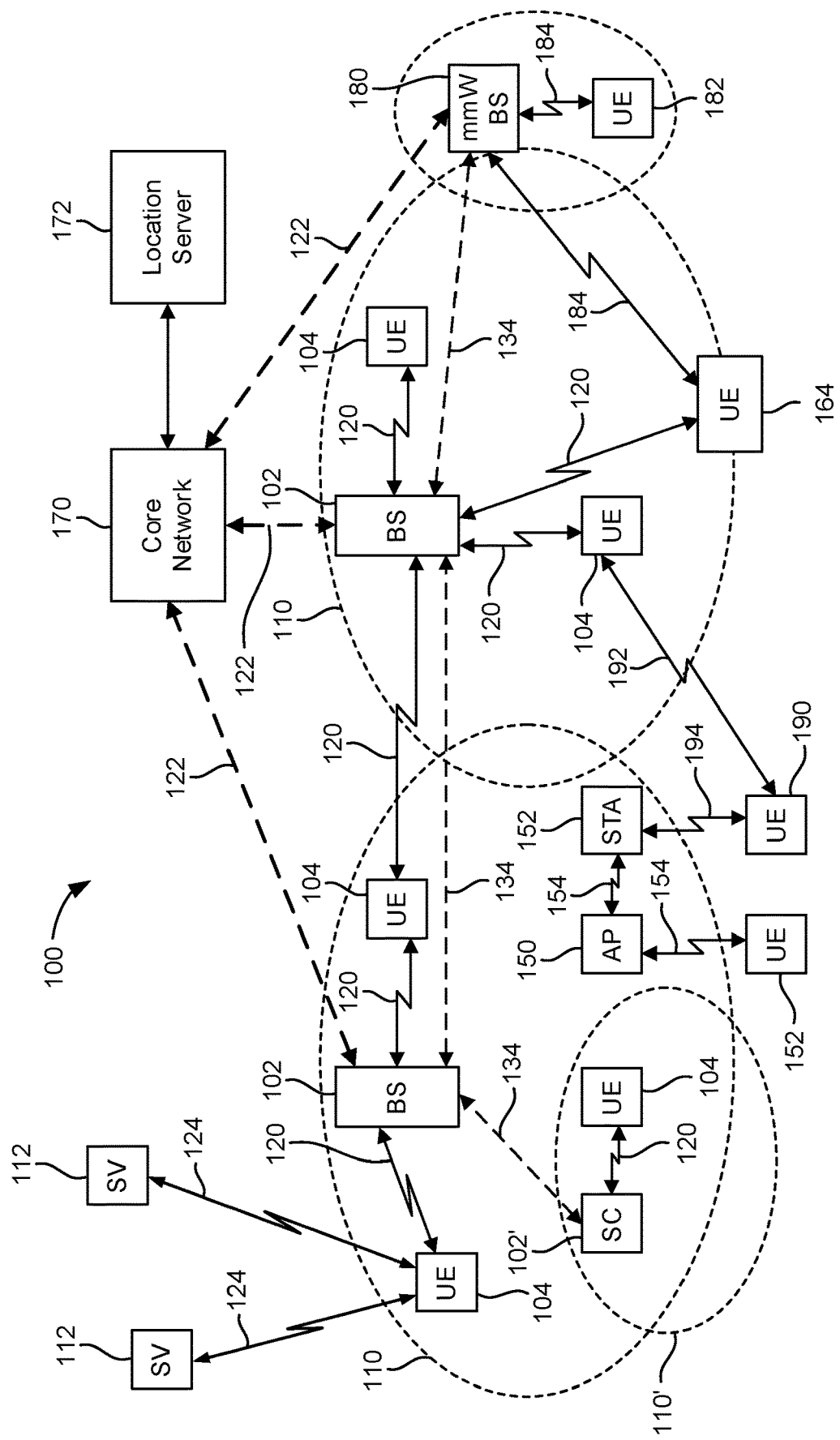
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive signals for deriving geo location information from the SVs 112. An SPS typically includes a system of transmitters (e.g., SVs 112) positioned to enable receivers (e.g., UEs 104) to determine their location on or above the Earth based, at least in part, on signals received from the transmitters via satellite communications links 124. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
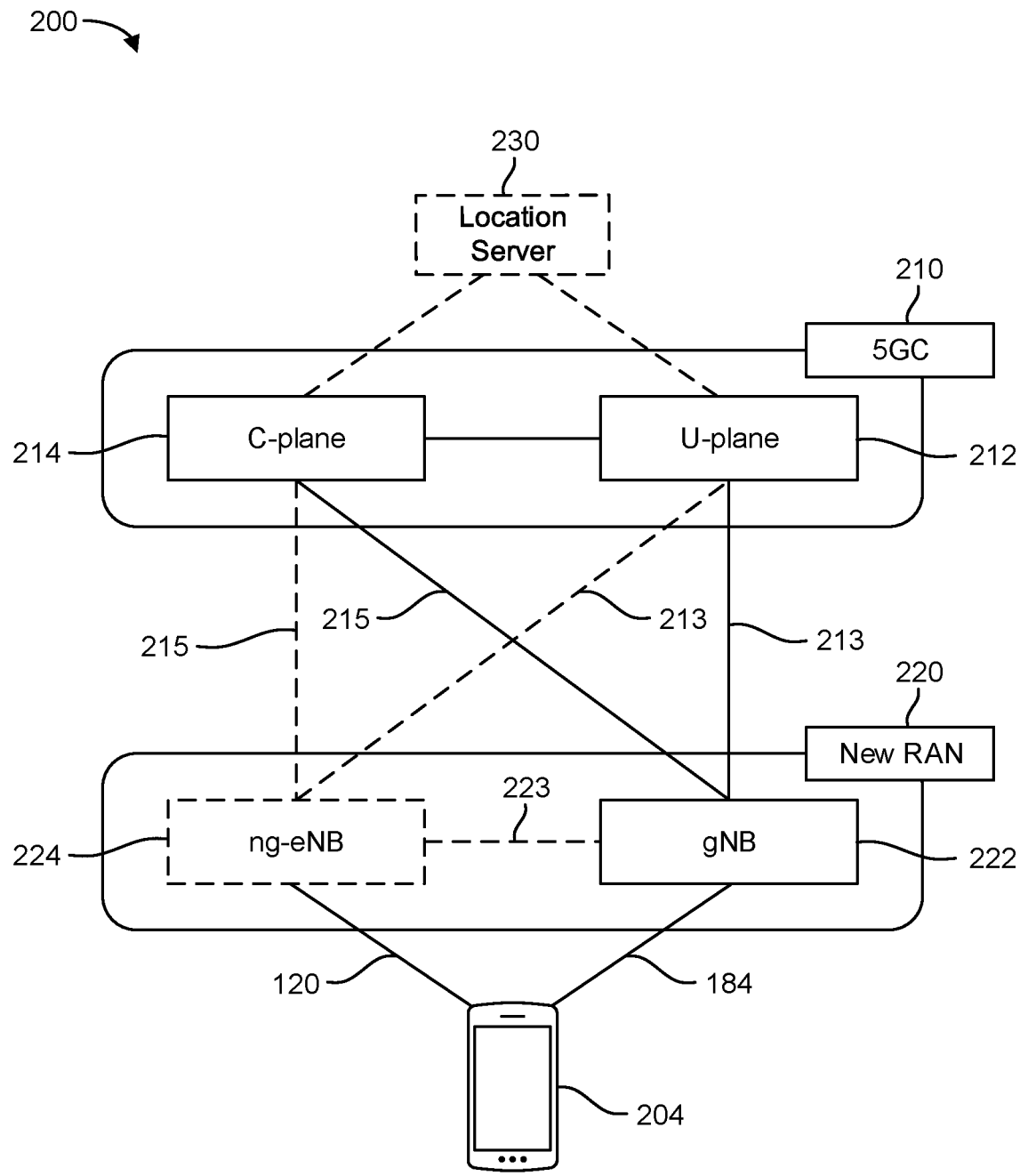
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
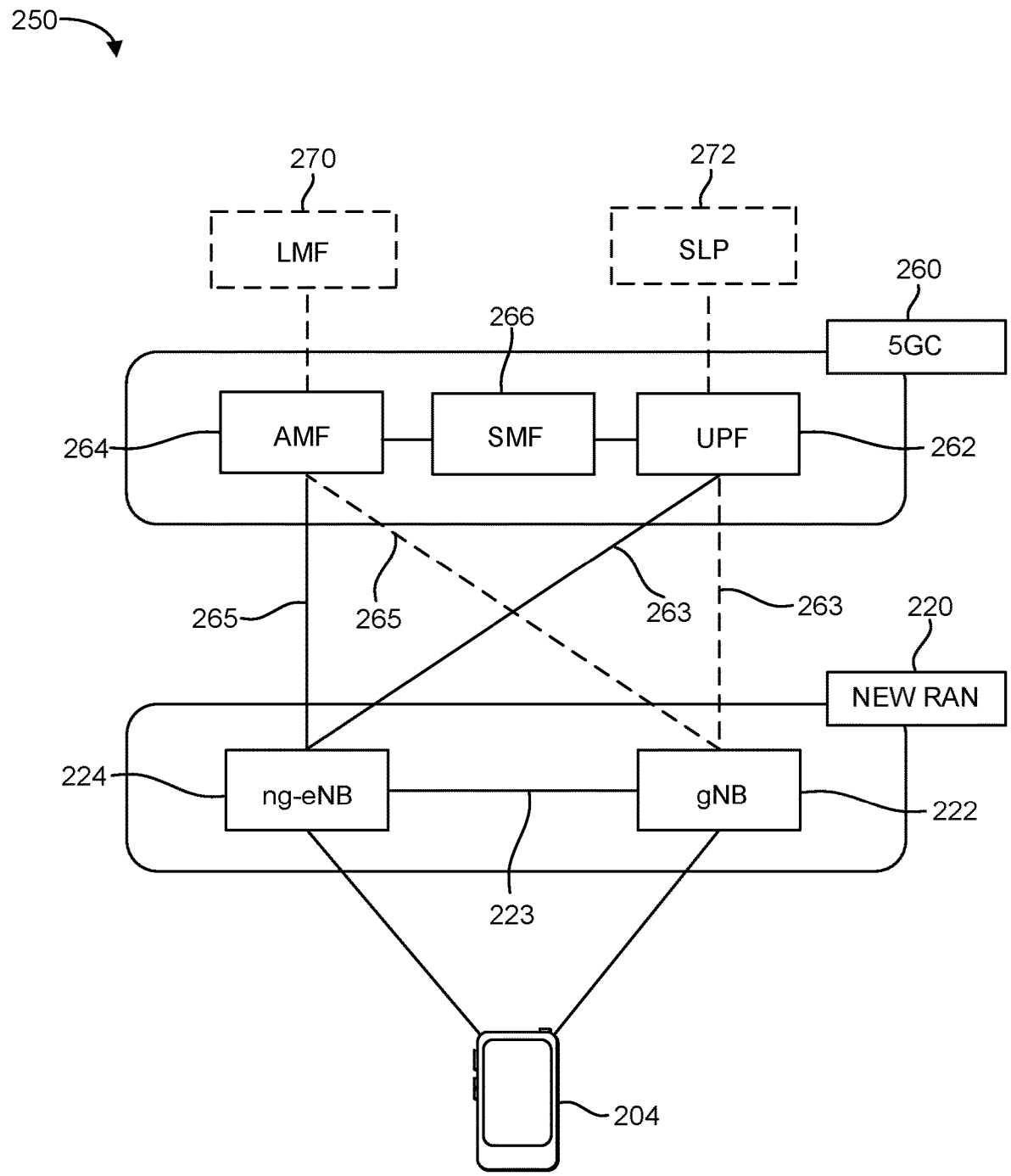

FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
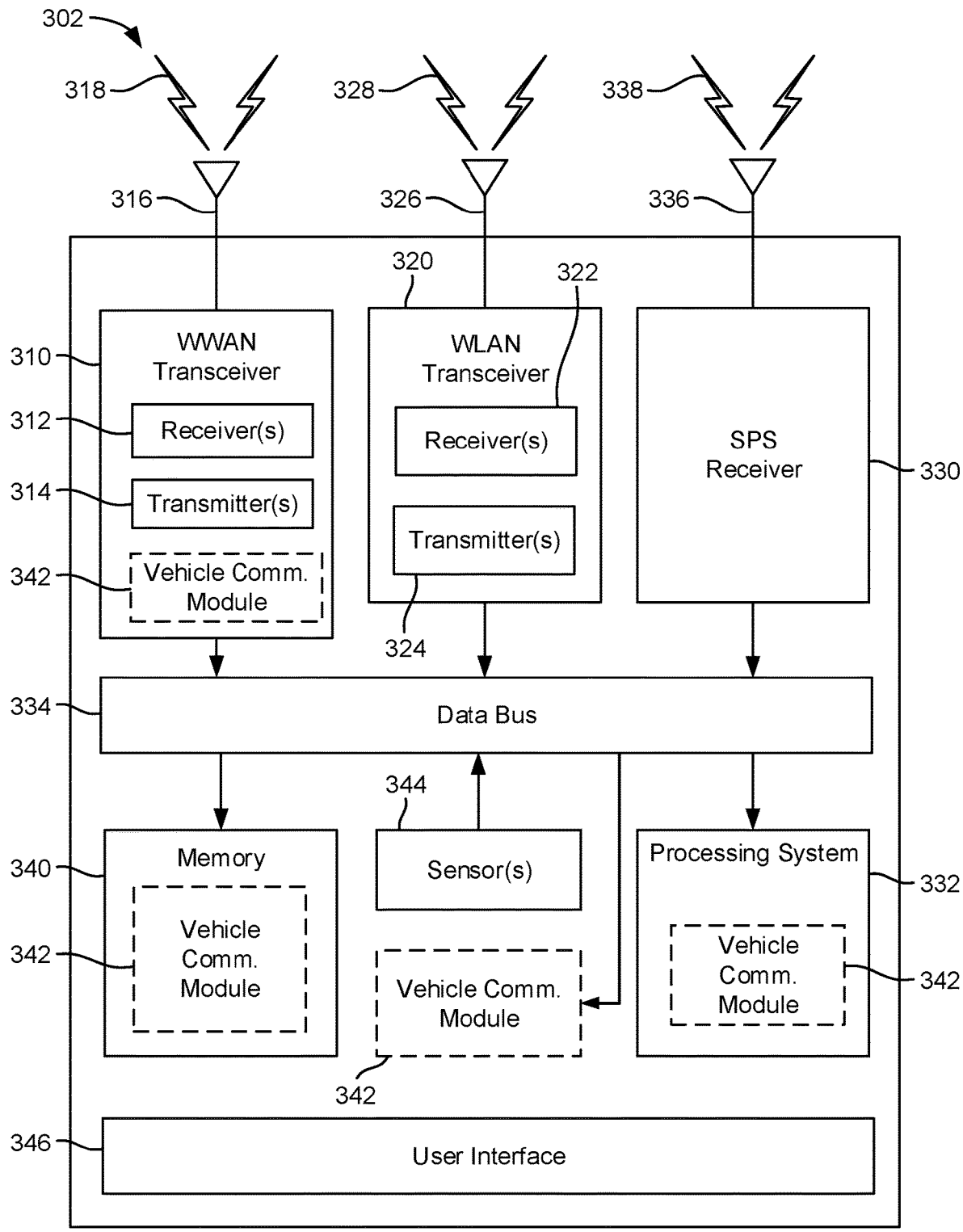
FIGS. 3A to 3C are simplified block diagrams of several sample aspects of components that may be employed in a user equipment (UE), a base station, and a network entity, respectively, and configured to support communications as taught herein.
Figure 3B:
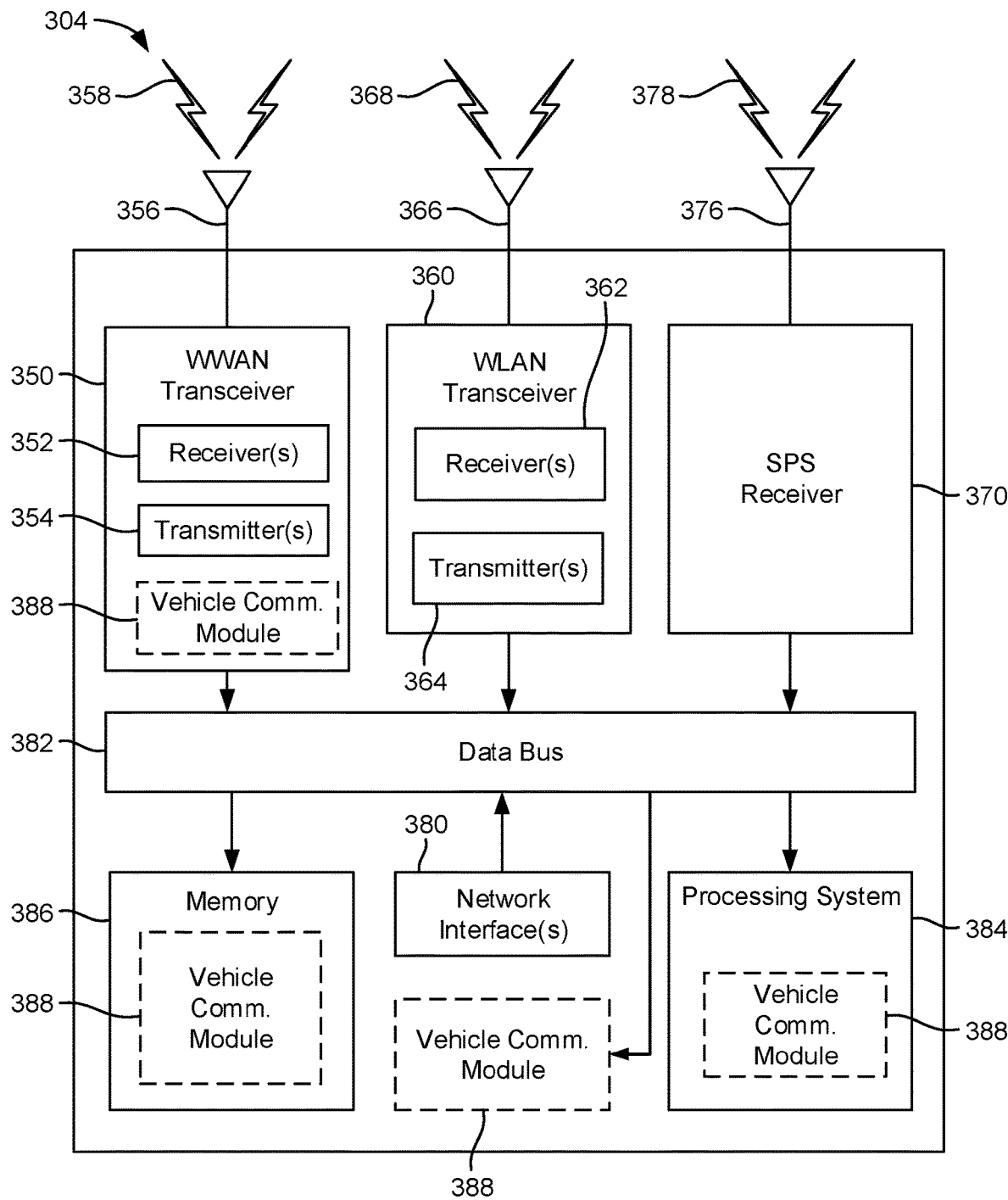
Figure 3C:
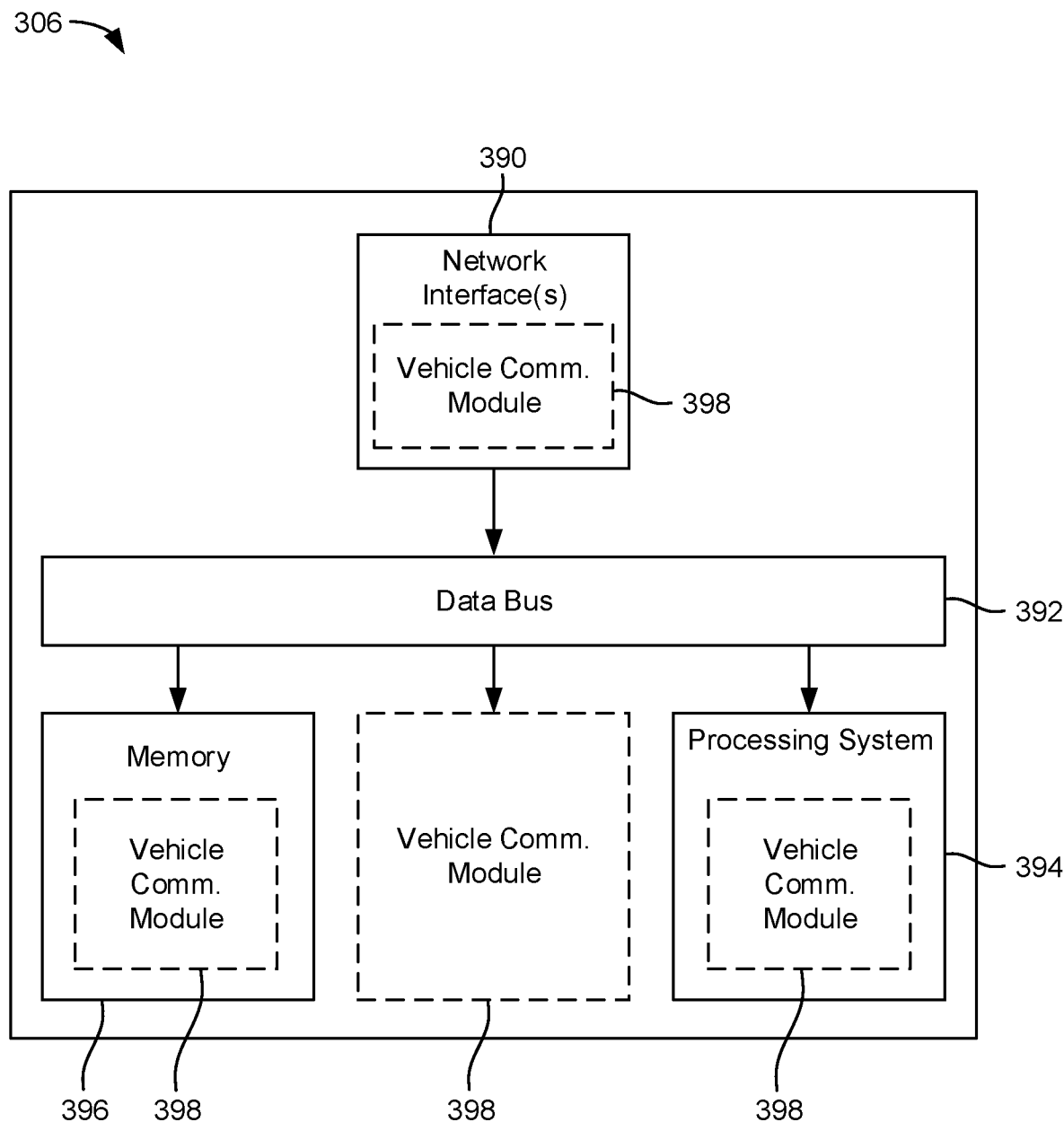

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include Vehicle Communications Modules 342, 388, and 398, respectively. The Vehicle Communications Modules 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the Vehicle Communications Modules 342, 388, and 398 may be external to the processing systems 332, 384, and 394 (e.g., part of a modem processing system, integrated with another processing system, etc.). Alternatively, the Vehicle Communications Modules 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the Vehicle Communications Module 342, which may be part of the WWAN transceiver 310, the memory component 340, the processing system 332, or any combination thereof, or may be a standalone component. FIG. 3B illustrates possible locations of the Vehicle Communications Module 388, which may be part of the WWAN transceiver 350, the memory component 386, the processing system 384, or any combination thereof, or may be a standalone component. FIG. 3C illustrates possible locations of the Vehicle Communications Module 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the Vehicle Communications Modules 342, 388, and 398, etc.

In some designs, communications device such as UEs (e.g., UE 302) may wirelessly connect to an in-vehicle network. In-vehicle networks may provide various services, such as advanced driver assistance, safety features, infotainment services, etc. Supporting these features demands deployment of ever-increasing number of electronic control units (ECU) and their associated distributed network of sensors, streaming units, radars, and so on.

One of the main challenges of wireless in-vehicle networks compared to traditional wired networks is inter-vehicle interference to and its detrimental effect on intra-vehicle communication. For example, if multiple vehicles are equipped with in-vehicle wireless networks on the same frequency band and are within proximity to each other, harmful interference may result which can lead to degraded data reception at the processing unit (or vehicle controller) of the vehicles. The problem of the inter-vehicle interference becomes even more of a concern when the vehicle is in a self-driving mode, since the inter-vehicle interference can lead to incorrect or corrupt data being received from sensors and cameras and around the vehicle, in turn leading to harmful moves/actions made by the vehicle.

Some current vehicles are equipped with a large numbers of sensors, cameras and other devices which allows them to detect and sense the environment and objects around them and enable an autonomous driving experience. Connecting these devices has many advantages, but achieving coexistence with other vehicles within close proximity (e.g., inter-vehicle interference) and/or handling harsh channel conditions within the vehicle (e.g., rich multipath, engine noise, high pathloss, severe scattering in a limited space and often non-line of sight channels, etc.) may be difficult. Given the challenging channel condition and high path loss (e.g., as high as 84 dB average path loss depending on the location of receiver and transmitter), the transmission power required to send the data successfully to the destination, which is predominantly the central processing unit (or vehicle controller) can be quite high. However, this high transmission power can be problematic for inter-vehicle interference, especially if the vehicles are driving or located very close to each other.

Figure 4:
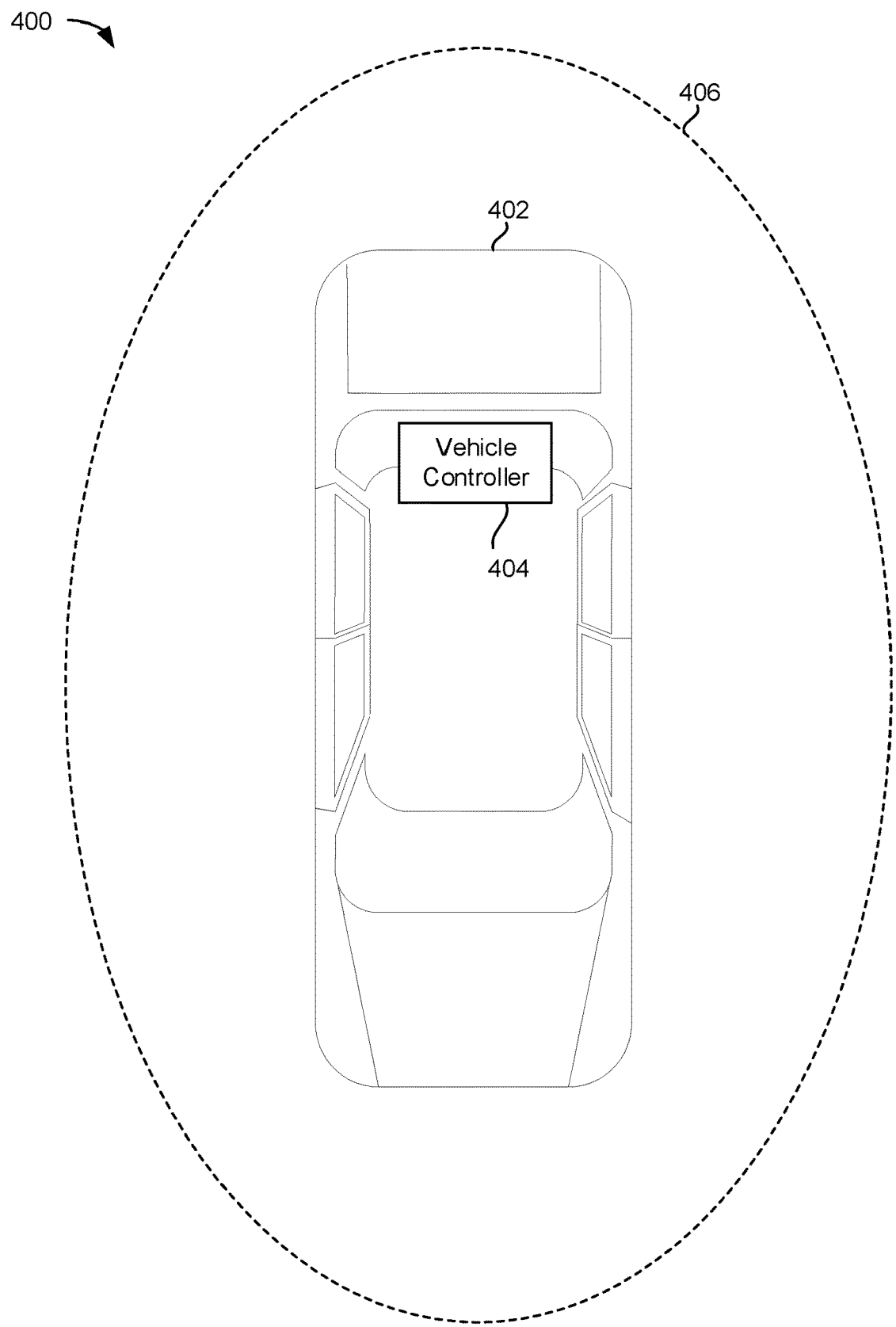
FIG. 4 illustrates an example vehicle configuration in accordance with an aspect of the disclosure.

FIG. 4 illustrates an example vehicle configuration 400 in accordance with an aspect of the disclosure. In the vehicle configuration 400 of FIG. 4, a vehicle 402 is equipped with a vehicle controller 404 (e.g., a processing unit, such as an ECU). While not shown expressly, the vehicle controller 404 comprises a wireless communications interface that may include one or more antennas. This wireless communications interface provides wireless coverage across a vehicle region 406 (which includes the interior of the vehicle 402 itself as well as some area surrounding the vehicle). Hence, if the vehicle 402 becomes proximate to another vehicle with a similar wireless coverage area, the respective vehicle regions will collide, which may result in interference if the respective vehicle controllers are operating on interfering bands.

One way to mitigate the above-noted intervehicle interference problem is to simply reduce transmission power when a nearby vehicle (or other interference source) is detected. However, such an approach will result in failed connections in a high pathloss environment such as a vehicle.

Aspects of the disclosure are thereby directed to a vehicle communications system that comprises both a vehicle controller including a wireless communications interface capable of providing wireless coverage in a plurality of vehicle regions (e.g., subdivisions of a larger monolithic vehicle region as shown in FIG. 4). The vehicle communications system further includes a set of relay devices that are each communicatively coupled (e.g., via a wired link or wireless link) to the vehicle controller and are each capable of providing wireless coverage in at least one of the plurality of vehicle regions. Hence, the set of relay devices is capable of providing wireless coverage that overlaps with some or all of the wireless coverage that the vehicle controller is capable of providing direct wireless coverage. As will be described below in more detail, in some designs, the set of relay devices may be opportunistically activated or deactivated based on a traffic condition (e.g., interference caused by a neighboring interference source and/or detection of the neighboring interference source). Such aspects may provide various technical advantages, such as reducing interference between a vehicle and a nearby interference source.

Figure 5:
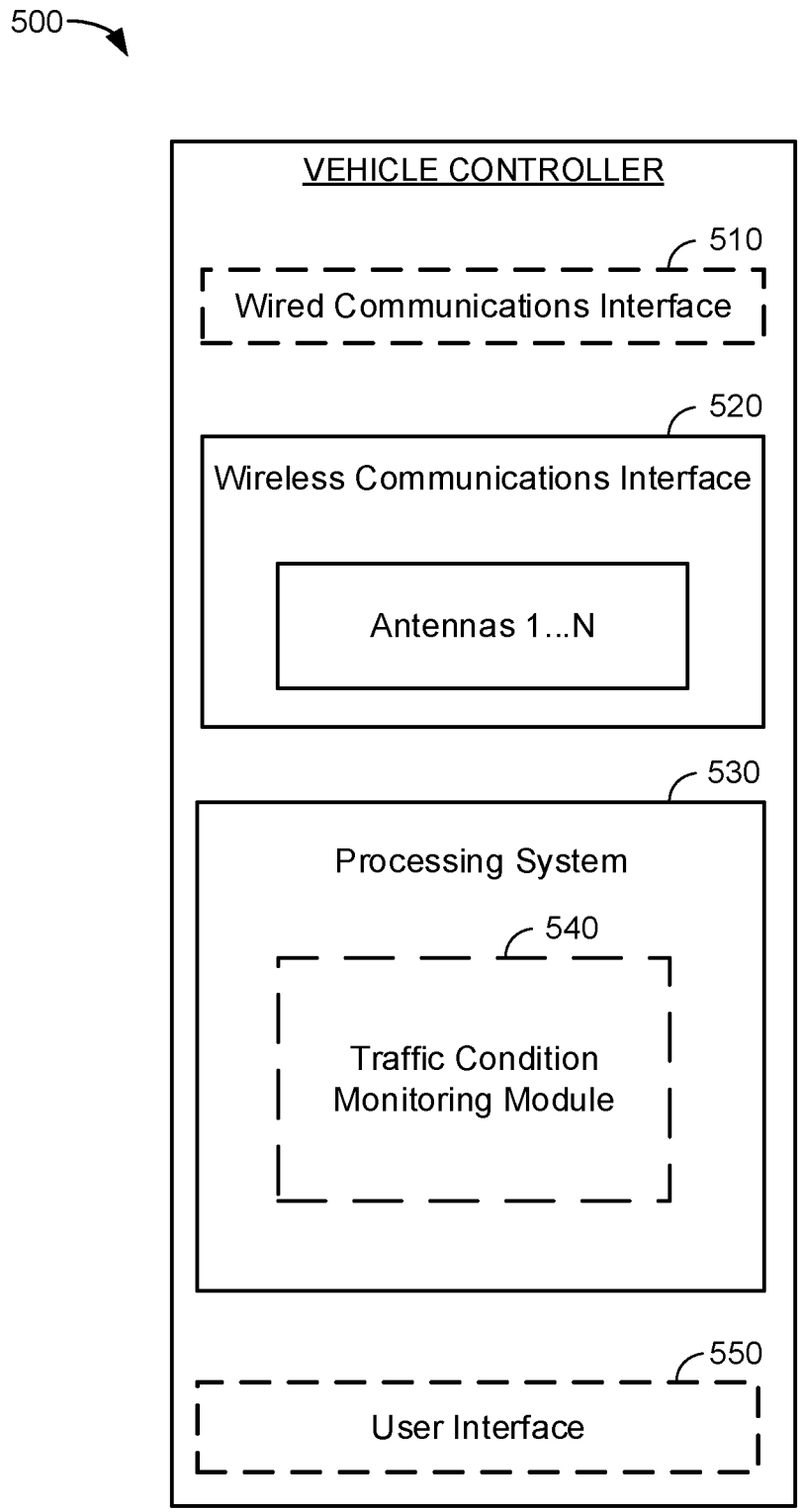
FIG. 5 illustrates a vehicle controller in accordance with an aspect of the disclosure.

FIG. 5 illustrates a vehicle controller 500 in accordance with an aspect of the disclosure. The vehicle controller 500 optionally includes a wired communications interface 510 for communicating with intra-vehicle devices, such as relay devices as will be described in more detail below. In some designs, the optional wired communications interface 510 may be configured as a Controller Area Network bus (CAN-BUS). The vehicle controller 500 further includes an intra-vehicle wireless communications interface 520. The intra-vehicle wireless communications interface 520 may operate in accordance with any well-known short-range wireless communications protocol, including Bluetooth, WLAN, etc. In some designs, the intra-vehicle wireless communications interface 520 is operable to communicate with various communications devices (e.g., UEs, cameras, sensors, etc.) in across multiple vehicle regions (e.g., which collectively may approximate the large single or monolithic wireless coverage area depicted in FIG. 4). The wireless communications interface 520 may include antennas 1 . . . N, where N is greater than or equal to 1. In some designs, the antennas 1 . . . N may be configured at different locations of the vehicle (e.g., at various locations of the passenger cabin, underneath or outside the vehicle, in the vehicle trunk, in an engine area of the vehicle, inside a battery housing of the vehicle, etc.). While not shown in FIG. 5, the vehicle controller 500 may also include other types of components, such as a WWAN interface, a Vehicle-to-Vehicle (V2V) interface, and so on, for communicating with devices external to the vehicle.

Referring to FIG. 5, the vehicle controller 500 further includes a processing system 530 which may comprise various processing components (e.g., a bus, one or more processors, a memory, etc.). The processing system comprises a traffic condition monitoring module 540, which may be executed by an associated processor to perform various tasks related to intra-vehicle operational mode control, as will be described below in more detail. The vehicle controller 550 may further optionally include a user interface 550 (e.g., a touchscreen, buttons, etc.) that permits a user to interact with a vehicle control system.

Figure 6:
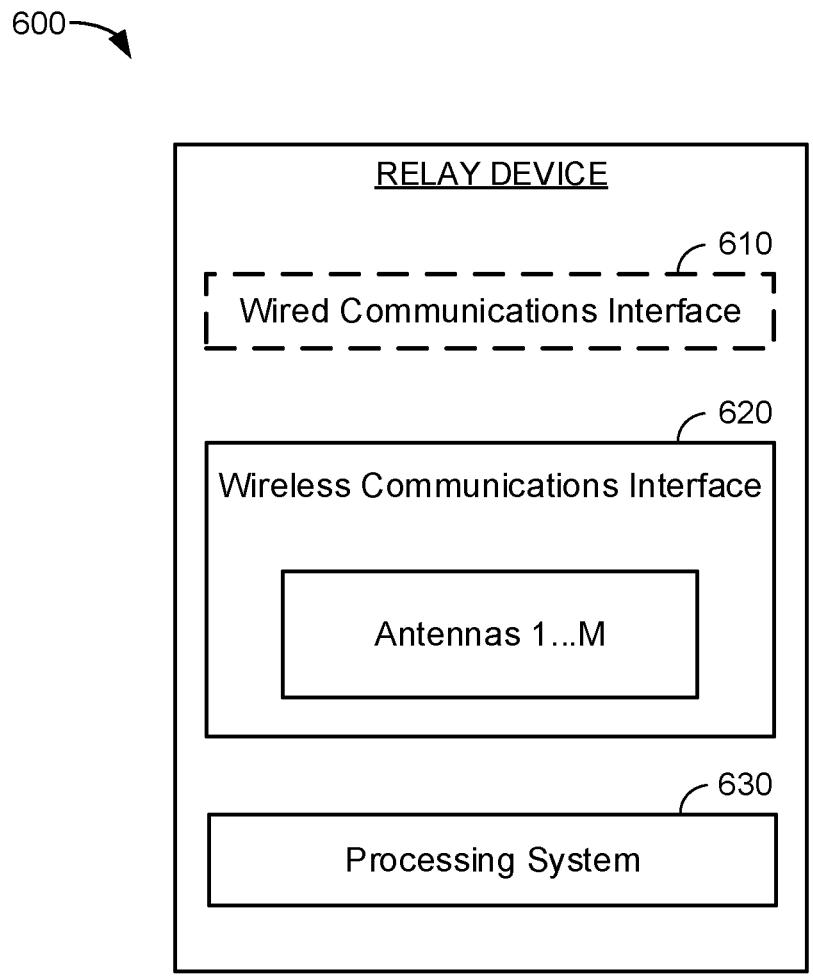
FIG. 6 illustrates a relay device in accordance with an aspect of the disclosure.

FIG. 6 illustrates a relay device 600 in accordance with an aspect of the disclosure. In some designs, the relay device 600 may be one of a plurality of relay devices deployed in different areas of a vehicle. In other designs, a vehicle may be deployed with a single relay device. The relay device optionally includes a wired communications interface 610 for communicating with the vehicle controller 500. In some designs, the optional wired communications interface 610 may be configured as a Controller Area Network bus (CAN-BUS). The relay device 600 further includes an intra-vehicle wireless communications interface 620. The intra-vehicle wireless communications interface 620 may operate in accordance with any well-known short-range wireless communications protocol, including Bluetooth, a Vehicle-to-Vehicle (V2V) protocol, WLAN, etc. In some designs, the intra-vehicle wireless communications interface 620 is operable to communicate with various communications devices (e.g., UEs, cameras, sensors, etc.) in a particular vehicle region. In some designs, the intra-vehicle wireless communications interface 620 is also operable to communicate with the corresponding intra-vehicle wireless communications interface 520 of FIG. 5.

The wireless communications interface 620 may include antennas 1 . . . N, where N is greater than or equal to 1. In some designs, the antennas 1 . . . M may be configured at different locations of the vehicle (e.g., at various locations of the passenger cabin, underneath or outside the vehicle, in the vehicle trunk, in an engine area of the vehicle, inside a battery housing of the vehicle, etc.). Unlike the antennas 1 . . . N of the vehicle controller 500, the antennas 1 . . . M of the relay device 600 may be specially configured, or tuned, to provide a narrower wireless coverage. Generally, this results in the relay device 600 providing coverage to its respective vehicle region at a lower transmission power than would be required for the vehicle controller 500 to provide comparable coverage.

Referring to FIG. 6, the relay device 600 further includes a processing system 630 which may comprise various processing components (e.g., a bus, one or more processors, a memory, etc.). In some designs, the relay device 600 may be configured primarily to follow commands issued by the vehicle controller 500 (e.g., to activate or deactivate relay functionality, modify transmission power, etc.).

Figure 7A:
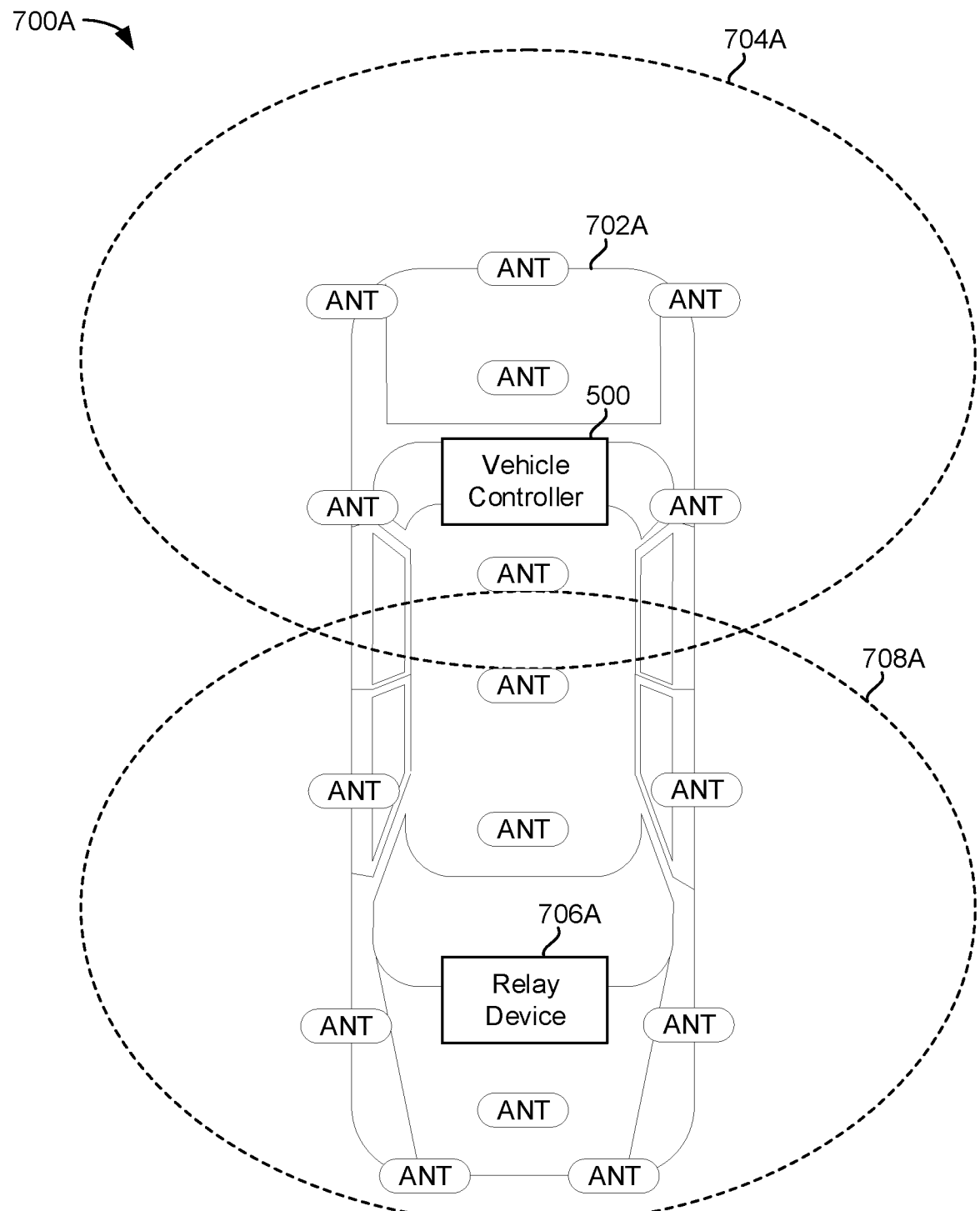
FIG. 7A illustrates an example vehicle configuration in accordance with an aspect of the disclosure.

FIG. 7A illustrates an example vehicle configuration 700A in accordance with an aspect of the disclosure. In particular, the vehicle configuration 700A depicted in FIG. 7A illustrates an example where a relaying mode is enabled. In the vehicle configuration 700A of FIG. 7A, a vehicle 702A is equipped with the vehicle controller 500 that includes a wireless communications interface with a number of antennas denoted as ANT inside of a vehicle region 704A (which may include the interior of the vehicle 702A itself as well as some area surrounding the vehicle 702A). In this example, the vehicle region 704A spans the front half of the vehicle 702A (and some surrounding area).

In the vehicle configuration 700A of FIG. 7A, the vehicle 702A is further equipped with a relay device 706A, which may be configured as described above with respect to the relay device 600 of FIG. 6. The relay device 706A includes a wireless communications interface with a number of antennas denoted as ANT inside of a vehicle region 708A (which may include the interior of the vehicle 702A itself as well as some area surrounding the vehicle 702A). In this example, the vehicle region 704A spans the back half of the vehicle 702A (and some surrounding area).

Referring to FIG. 7A, the vehicle configuration 700A is configured for a first mode of operation, where the wireless communications interface 520 of the vehicle controller 500 is partially deactivated so as to provide wireless coverage in less than all vehicle regions while the relay device 706A is activated so as to provide wireless coverage in vehicle region 708A. In a second mode of operation, the wireless communications interface 520 of the vehicle controller 500 may instead be activated to provide wireless coverage in a plurality of vehicle regions (spanning each of the vehicle regions 704A and 708A) while each relay device is deactivated. In this case, the resultant configuration would approximate the vehicle region 400 depicted in FIG. 4. Various rules by which the vehicle controller 500 may toggle between the first and second modes will be described in more detail, and generally may be related to monitoring of a traffic condition.

Figure 7B:
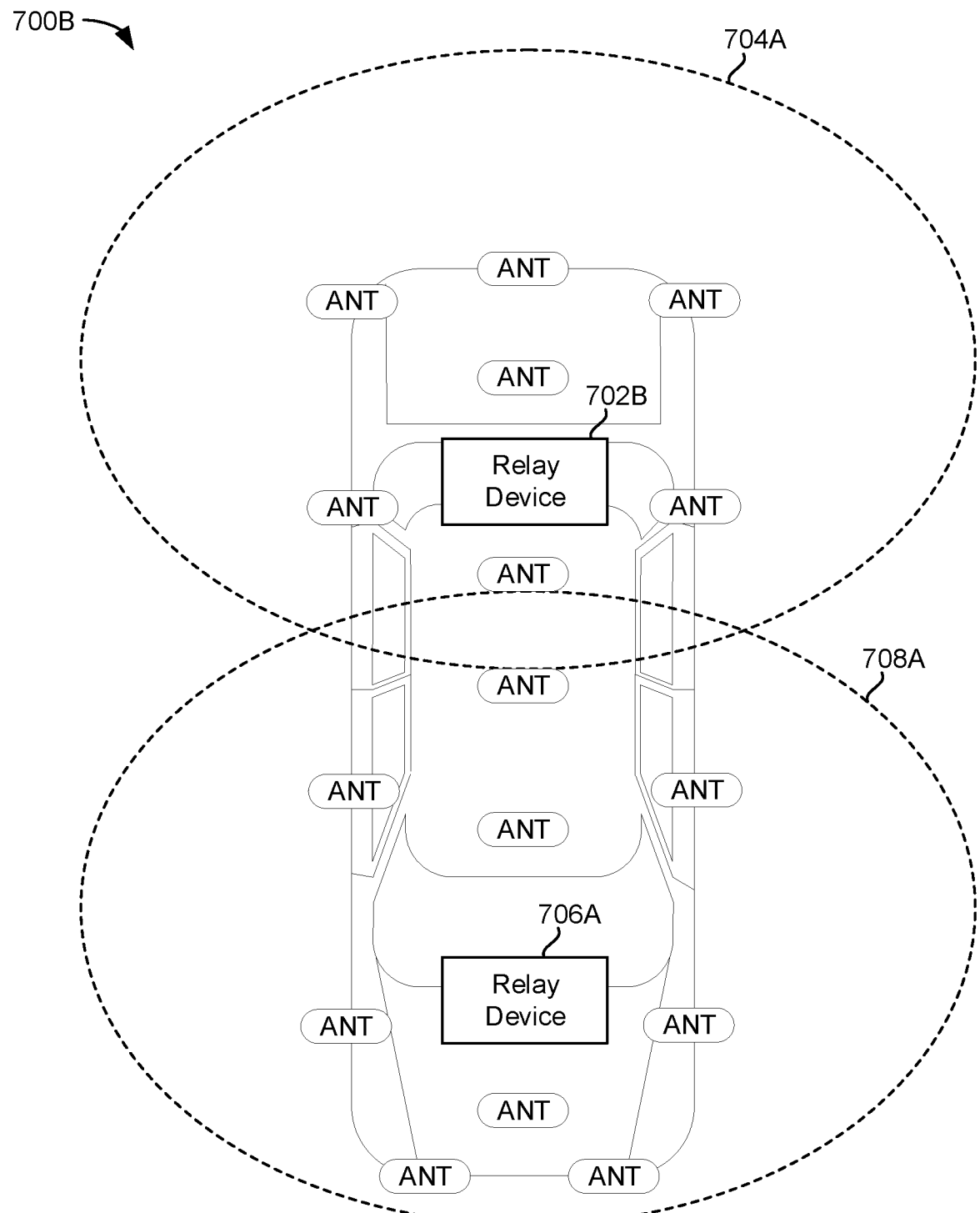
FIG. 7B illustrates an example vehicle configuration in accordance with another aspect of the disclosure.

FIG. 7B illustrates an example vehicle configuration 700B in accordance with another aspect of the disclosure. The vehicle configuration 700B is similar to the vehicle configuration 700A of FIG. 7A, except that a relay device 702B is used to provide wireless coverage in the vehicle region 704A instead of the vehicle controller 500. So, in FIG. 7A, the vehicle controller 500 is partially deactivated (e.g., reducing antenna transmission power, toggling some antennas off, etc.) to narrow its directly supported vehicle region to 704A, while in FIG. 7B the vehicle controller 500 is fully deactivated (e.g., shutting off antenna transmission powers, toggling all its antennas off, etc.). In some designs, the vehicle configuration 700B may include more antennas than the vehicle configuration 700A of FIG. 7A, since the antennas of the relay device 702B in the vehicle region 704A would be needed in addition to those of the vehicle controller 500 in this region to accommodate the first mode of operation.

Figure 8A:
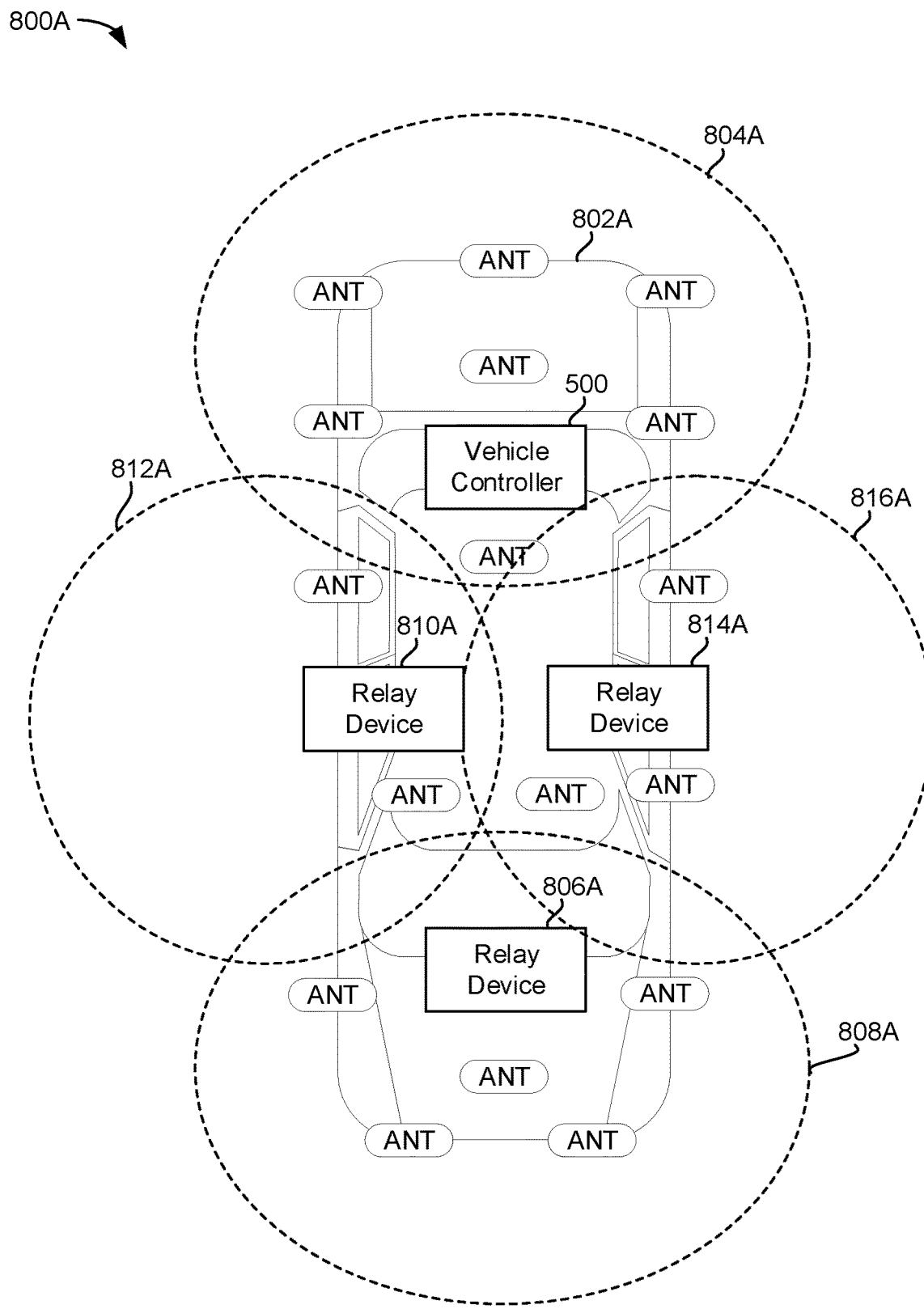
FIG. 8A illustrates an example vehicle configuration in accordance with another aspect of the disclosure.

FIG. 8A illustrates an example vehicle configuration 800A in accordance with another aspect of the disclosure. In particular, the vehicle configuration 800A depicted in FIG. 8A illustrates an example where a relaying mode is enabled. In the vehicle configuration 800A of FIG. 8A, a vehicle 802A is equipped with the vehicle controller 500 that includes a wireless communications interface with a number of antennas denoted as ANT inside of a vehicle region 804A (which may include the interior of the vehicle 802A itself as well as some area surrounding the vehicle 802A). In this example, the vehicle region 804A spans a front quadrant of the vehicle 802A (and some surrounding area).

In the vehicle configuration 800A of FIG. 8, the vehicle 802A is further equipped with a relay device 806A, which may be configured as described above with respect to the relay device 600 of FIG. 6. The relay device 806A includes a wireless communications interface with a number of antennas denoted as ANT inside of a vehicle region 808A (which may include the interior of the vehicle 802A itself as well as some area surrounding the vehicle 802A). In this example, the vehicle region 808A spans a back quadrant of the vehicle 802A (and some surrounding area).

In the vehicle configuration 800A of FIG. 8, the vehicle 802A is further equipped with a relay device 810A, which may be configured as described above with respect to the relay device 600 of FIG. 6. The relay device 810A includes a wireless communications interface with a number of antennas denoted as ANT inside of a vehicle region 812A (which may include the interior of the vehicle 802A itself as well as some area surrounding the vehicle 802A). In this example, the vehicle region 812A spans a side quadrant of the vehicle 802A (and some surrounding area).

In the vehicle configuration 800A of FIG. 8, the vehicle 802A is further equipped with a relay device 814A, which may be configured as described above with respect to the relay device 600 of FIG. 6. The relay device 814A includes a wireless communications interface with a number of antennas denoted as ANT inside of a vehicle region 816A (which may include the interior of the vehicle 802A itself as well as some area surrounding the vehicle 802A). In this example, the vehicle region 816A spans another side quadrant of the vehicle 802A (and some surrounding area).

Referring to FIG. 8A, the vehicle configuration 800A is configured for a first mode of operation, where the wireless communications interface 520 of the vehicle controller 500 is partially deactivated so as to provide wireless coverage in less than all vehicle regions while one or more of the relay devices 806A, 810A and 814A are activated so as to provide wireless coverage in vehicle regions 808A, 812A and/or 816A. In a second mode of operation, the wireless communications interface 520 of the vehicle controller 500 may instead be activated to provide wireless coverage in a plurality of vehicle regions (spanning each of the vehicle regions 804A, 808A, 812A and 816A) while each relay device is deactivated. In this case, the resultant configuration would approximate the vehicle region 400 depicted in FIG. 4. Various rules by which the vehicle controller 500 may toggle between the first and second modes will be described in more detail, and generally may be related to monitoring of a traffic condition.

Figure 8B:
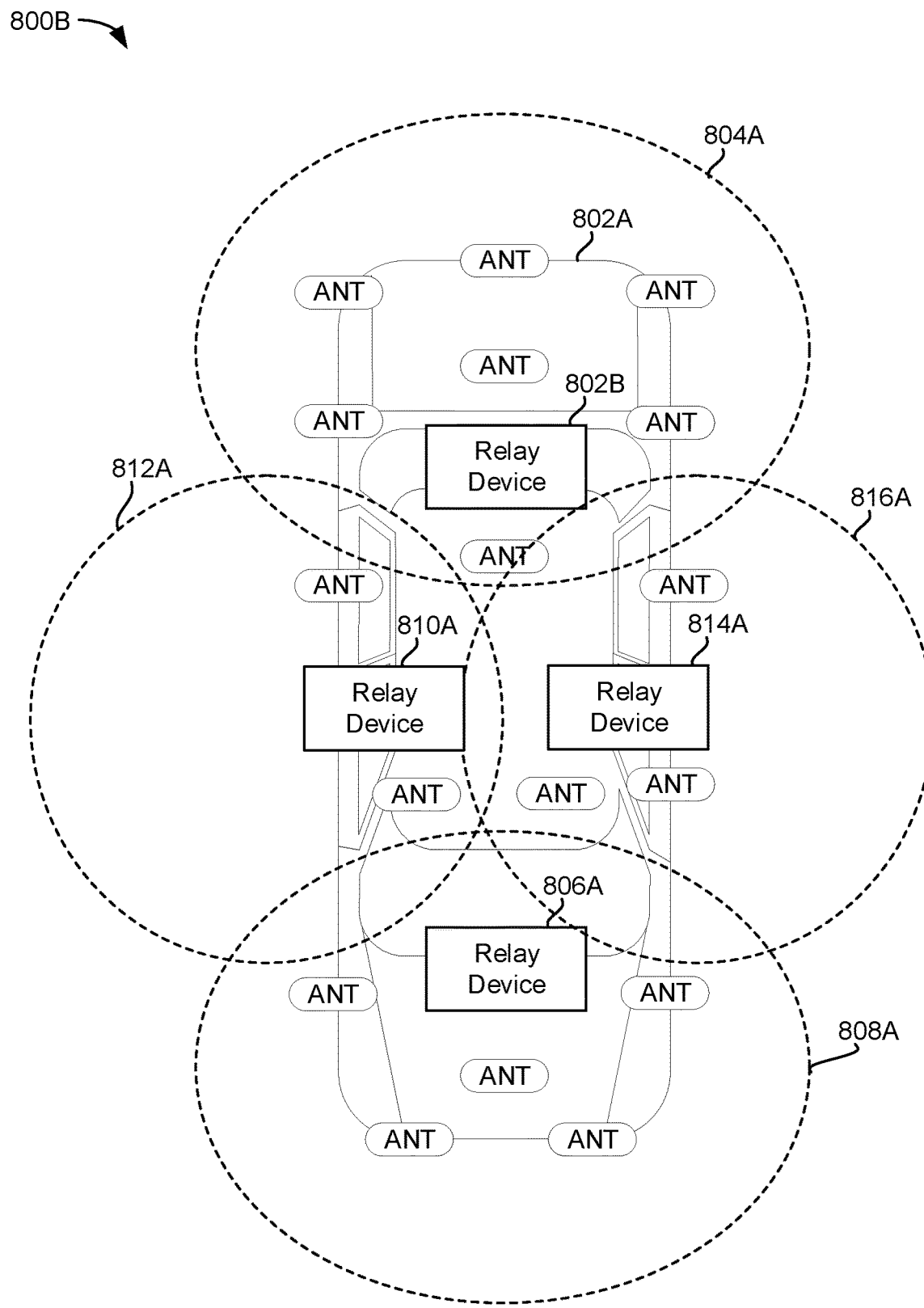
FIG. 8B illustrates an example vehicle configuration in accordance with another aspect of the disclosure.

FIG. 8B illustrates an example vehicle configuration 800B in accordance with another aspect of the disclosure. The vehicle configuration 800B is similar to the vehicle configuration 800A of FIG. 8A, except that a relay device 802B is used to provide wireless coverage in the vehicle region 804A instead of the vehicle controller 500. So, in FIG. 8A, the vehicle controller 500 is partially deactivated (e.g., reducing antenna transmission power, toggling some antennas off, etc.) to narrow its directly supported vehicle region to 804A, while in FIG. 8B the vehicle controller 500 is fully deactivated (e.g., shutting off antenna transmission powers, toggling all its antennas off, etc.). In some designs, the vehicle configuration 800B may include more antennas than the vehicle configuration 800A of FIG. 8A, since the antennas of the relay device 802B in the vehicle region 804A would be needed in addition to those of the vehicle controller 500 in this region to accommodate the first mode of operation.

Figure 9:
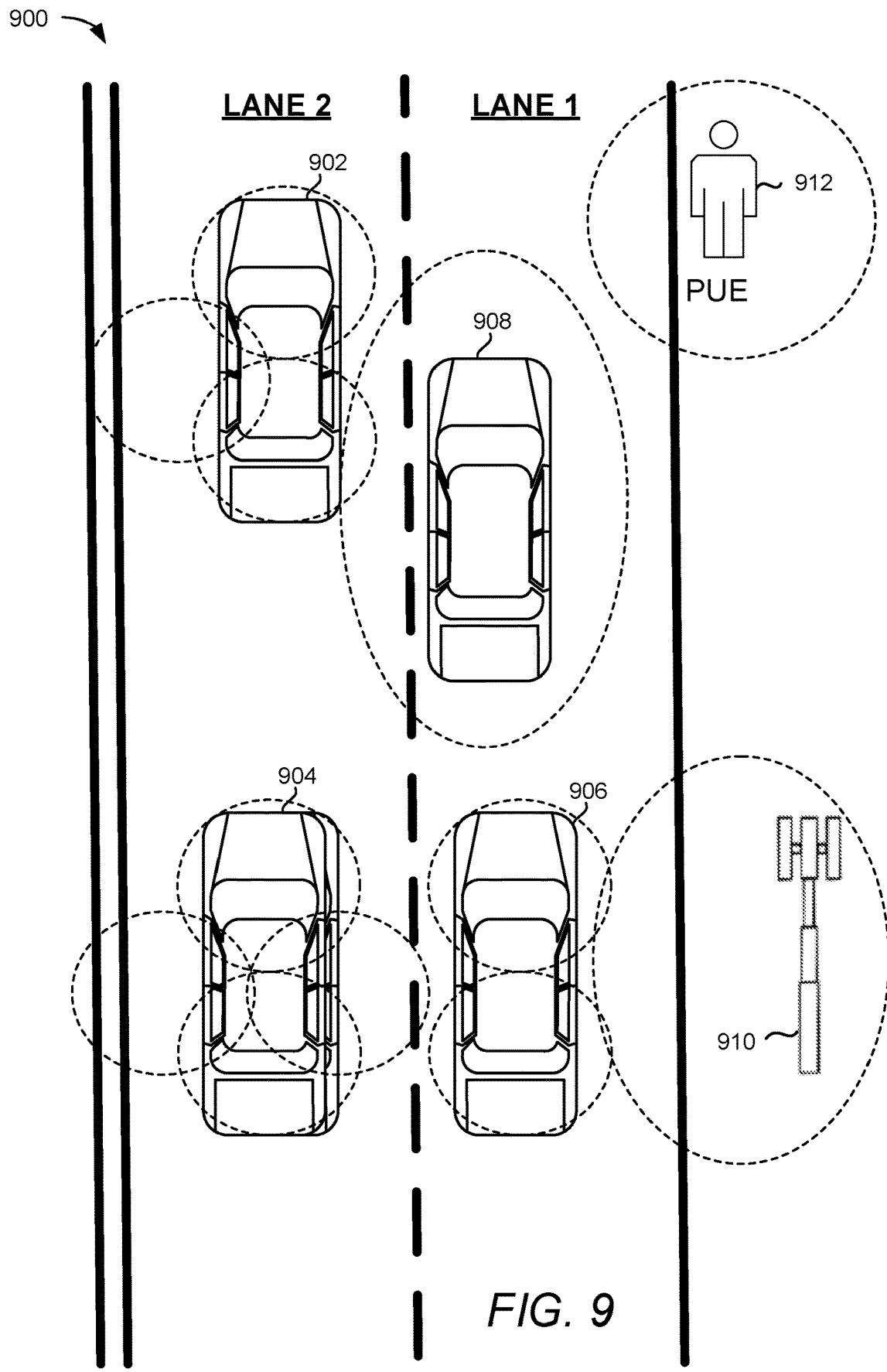
FIG. 9 illustrates a vehicle communications scenario in accordance with an aspect of the disclosure.

FIG. 9 illustrates a vehicle communications scenario 900 in accordance with an aspect of the disclosure. In FIG. 9, vehicles 902, 904, 906 and 908 are each driving in a respective traffic lane of a road. Vehicles 902-906 are configured in accordance with the vehicle configuration 800A of FIG. 8A or 800B of FIG. 8B, whereby four vehicle region quadrants are available during the first mode of operation. Vehicle 908 may either be configured with a similar capability while operating in the second mode of operation (e.g., where the vehicle controller 500 deactivates its relay devices and instead provides a single direct wireless coverage area), or else may be equipped withy a legacy vehicle configuration as shown in FIG. 4. In FIG. 9, respective sides of vehicles 904-906 are proximate to each other, and vehicle 906 is also proximate to an RSU 910 on an opposing side. Vehicle 908 is also proximate to a pedestrian UE (PUE) 912.

Referring to FIG. 9, the vehicle controller of vehicle 902 has activated each of its relay devices except for a relay device associated with a vehicle region closest to the vehicle 908 so as to reduce interference thereto. This relay device deactivation may facilitate vehicle 908 to retain its full monolithic vehicle region for wireless coverage, although as noted above vehicle 908 may simply be a legacy vehicle without capacity to use relays in other designs.

Referring to FIG. 9, the vehicle controller of vehicle 904 has activated each of its four relay devices, which reduces interference to vehicle 906. Meanwhile, the vehicle controller of vehicle 906 has deactivated each of its side relay devices to reduce interference to both vehicle 904 as well as RSU 910.

As will be described in more detail, the mode of operation (as well as which relay devices are activated in the first mode) at any given time may change based on a dynamic assessment of a traffic condition (e.g., detection of interference and/or a particular interference source).

Figure 10:
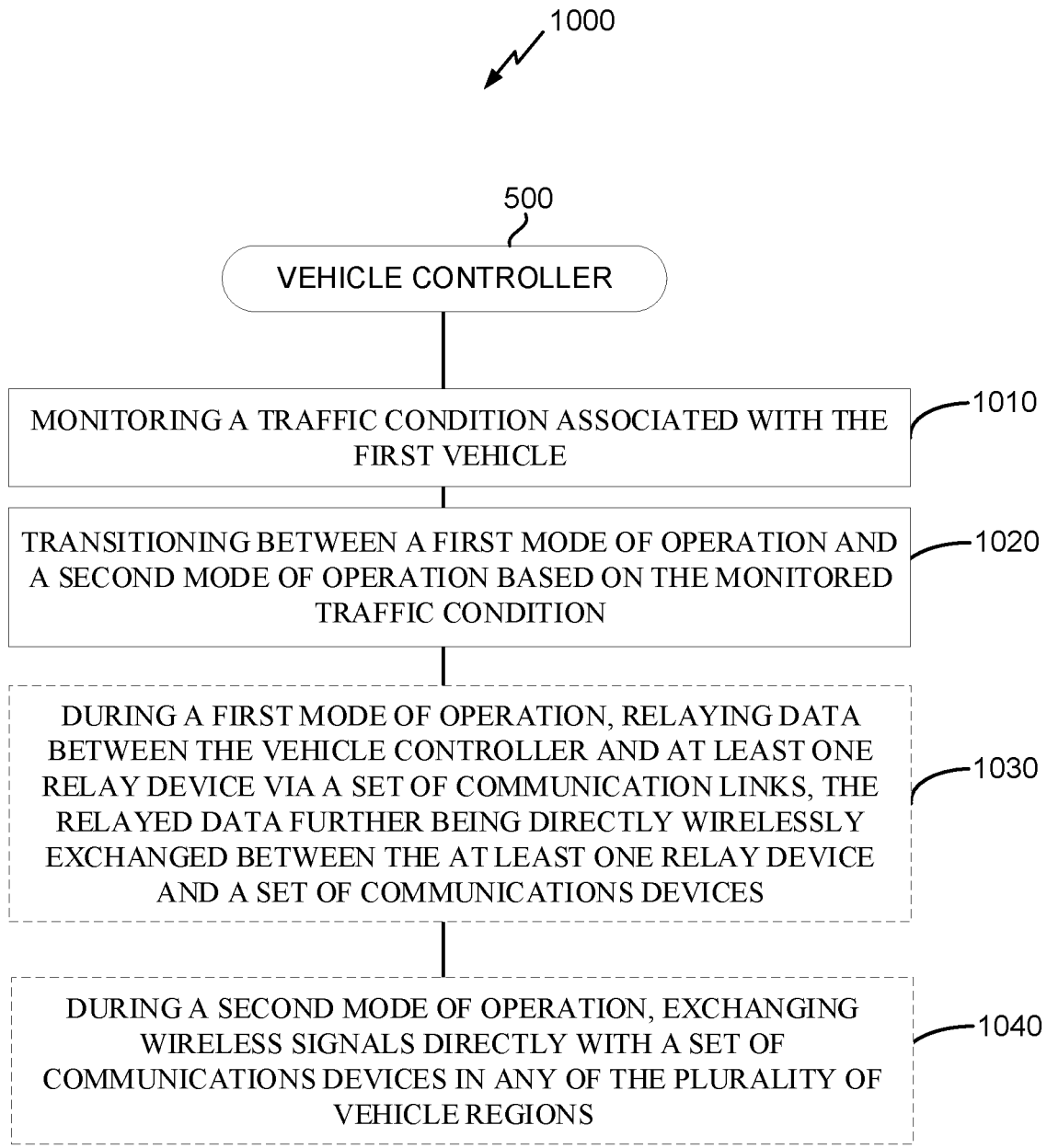
FIG. 10 illustrates an example process of wireless communication, according to aspects of the disclosure.

FIG. 10 illustrates an example process 1000 of wireless communication, according to aspects of the disclosure. The process 1000 of FIG. 10 may be performed by the vehicle controller 500.

At 1010, the vehicle controller 500 (e.g., traffic condition monitoring module 540) monitors a traffic condition associated with a first vehicle. In some designs, the traffic condition may comprise wireless interference (e.g., based on one or more interference measurements). In other designs, the traffic condition may comprise an interference source (e.g., second vehicle, a pedestrian user equipment (PUE), or a roadside unit (RSU)). For example, the interference source may be monitored based on an interference measurement, sensor-based detection of the interference source (e.g., LIDAR, a camera sensor, etc.), a direct communications link established with the interference source (e.g., a V2V connection), or a combination thereof.

At 1020, the vehicle controller 500 (e.g., wired communications interface 510, wireless communications interface 520) transitions from a first mode of operation and a second mode of operation based on the monitored traffic condition. For example, the transition at 1020 may be implemented by sending signaling to one or more communications devices, one or more relay devices, or both (e.g., instructing the relay devices to toggle on or off, instructing the communications device(s) to switch between direct wireless communication with the vehicle controller 500 to the direct wireless communication with one of the relays, etc.).

At 1030, during the first mode of operation, the vehicle controller 500 (e.g., wired communications interface 510, wireless communications interface 520) at least partially activates a set of relay devices so as to provide wireless coverage some or all of a plurality of vehicle regions while a wireless communications interface of the vehicle controller is at least partially deactivated so as to provide wireless coverage in less than all of the plurality of vehicle regions. As noted above, some or all of the available relay device(s) may be activated depending on the particular traffic condition that is detected by the vehicle controller 500.

At 1040, during the second mode of operation, the vehicle controller 500 (e.g., wireless communications interface 520) may optionally exchange wireless signals directly with a set of communications devices in any of the plurality of vehicle regions. In some designs, during the second mode of operation, the set of relay devices is deactivated while the wireless communications interface of the vehicle controller is activated so as to provide wireless coverage in the plurality of vehicle regions.

Referring to FIG. 10, in some designs where the traffic condition comprises wireless interference, the first mode of operation is transitioned to the second mode of operation at 1020 if the wireless interference is below a first interference threshold. In other designs where the traffic condition comprises wireless interference, the second mode of operation is transitioned to the first mode of operation at 1020 if the wireless interference is above a second interference threshold. In some designs, the first and second interference threshold may be the same, while in other designs the first and second interference thresholds may be offset from each other (e.g., to avoid a ping-ponging effect between the first and second modes.

Referring to FIG. 10, in some designs where the traffic condition comprises an interference source, the first mode of operation is transitioned to the second mode of operation at 1020 if the interference source is detected within a first threshold distance of the first vehicle. In other designs where the traffic condition comprises an interference source, the second mode of operation is transitioned to the first mode of operation at 1020 if the interference source is not detected within a first threshold distance of the first vehicle. In some designs, the first and second threshold distances may be the same, while in other designs the first and second threshold distances may be offset from each other (e.g., to avoid a ping-ponging effect between the first and second modes.

Referring to FIG. 10, in some designs, the set of relay devices comprises a single relay device that is capable of providing wireless coverage in a single vehicle region (e.g., as shown in FIG. 7A). In other designs, the set of relay devices comprises a plurality of relay devices that are each capable of providing wireless coverage in a respective vehicle region (e.g., as shown in any of FIGS. 7B-8B).

Referring to FIG. 10, in some designs, during the first mode of operation, each of the plurality of relay devices is activated (e.g., as shown with respect to vehicle 904 in FIG. 9). In other designs, during the first mode of operation, a first subset of the plurality of relay devices is activated and a second subset of the plurality of relay devices is deactivated (e.g., as shown with respect to vehicles 902 and 906 in FIG. 9). In some designs, the first subset of relay devices is associated with a first subset of the plurality of vehicle regions, the second subset of relay devices is associated with a second subset of the plurality of vehicle regions, and relative to the second subset of vehicle regions, the first subset of vehicle regions is associated with a higher level of interference, closer proximity an interference source, or both. An example of this aspect is shown in FIG. 9 where particular vehicle region quadrants are shutoff for vehicles 902 and 906 to avoid interference with a nearby vehicle or RSU. In other designs, PUE 912 could also have been a more significant interferer, which could potentially cause vehicle 908 to switch to the first mode of operation and/or even deactivate some of its relay device(s) while in the first mode of operation.

Referring to FIG. 10, in some designs, during the first mode of operation, relaying data between the vehicle controller and the at least one relay device via a set of communication links, the relayed data further being directly wirelessly exchanged between the at least one relay device and a set of communications devices (e.g., UEs, sensors, etc.). In some designs, the set of communications links comprise one or more wired communications links (e.g., CANBUS, etc.), or the set of communications links comprise one or more wireless communications links (e.g., Bluetooth, etc.), or a combination thereof (e.g., one or more wired-connected relays and one or more wireless-connected relays).

Referring to FIG. 10, in some designs, a transition from the second mode of operation to the first mode of operation may be triggered in a scenario where direct wireless transmissions for the vehicle become limited (e.g., below some transmission power threshold). Distributing the transmissions in this case across the relay devices will help to provide full coverage with each relay device transmitting at lower power than the vehicle controller 500 would need to transmit to span each vehicle region. In some designs, the use of relays has some drawbacks such as higher overall power consumption, higher latency, higher buffering requirements, etc. Hence, in some designs, the first mode of operation may generally be used in bad traffic conditions or high interference scenarios, with the second mode of operation being the default mode of operation.

Referring to FIG. 10, in some designs, the monitoring at 1010 may comprise monitoring to detect the presence of a nearby vehicle (e.g., within a threshold distance away from the vehicle, e.g., x meters away). In some designs, vehicle detection may be implemented via a sensor such as radar, V2X, etc. In some designs, when a proximate vehicle is detected, the vehicle controller 500 may establish a connection (e.g., a PC5 connection) with the proximate vehicle and determine if the proximate vehicle implements an in-vehicle wireless network that may potentially interfere with the vehicle controller's 500 own in-vehicle wireless network. If no proximate vehicle is detected or if a proximate vehicle does not have the potential to interfere with the vehicle controller's 500 in-vehicle wireless network, then the vehicle controller 500 may operate in accordance with the second mode of operation. By contrast, if a proximate vehicle that has the potential to interfere with the vehicle controller's 500 in-vehicle wireless network is detected, then the vehicle controller 500 may operate in accordance with the first mode of operation. Here, as one example, the vehicle controller 500 need not wait for an actual interference condition to be present before taking an interference mitigation action.

Referring to FIG. 10, in some designs, the connection between the vehicle controller 500 and the proximate vehicle may be adaptive (e.g., request only scheduling information associated with resources such as bandwidth, etc., that have the potential to interfere with the vehicle controller's 500 in-vehicle wireless network). As noted above, the particular vehicle region(s) at risk of interference may have their respective relays toggled on/off in a region-specific manner (e.g., different active relay combinations are possible during the first mode of operation). Also, the connection between the vehicle controller 500 and the proximate vehicle may be used to coordinate which vehicle(s) will operate in the first mode of operation, if any (e.g., one vehicle may stay in the first mode while the other vehicle transitions to the second mode, or one vehicle may stay in the second mode if the other vehicle is already in the first mode, or both vehicles may transition or stay in the first mode, etc.). Such coordination may be based on various factors, such as the degree of expected interference, vehicle-specific mode priority (e.g., vehicle 1 is self-driving and has higher priority than vehicle 2, so vehicle 1 stays in second mode while vehicle 2 switches to the first mode), and so on.

While various aspects described above relay devices integrated into a primary vehicle part (e.g., directly attached to the primary vehicle chassis), in other designs the in-vehicle wireless network may include vehicle attachments, such as trailers, items being hauled on trailers (e.g., crates, boats, etc.), and so on. Hence, the traffic condition monitored at 1010 of FIG. 10 may extend to areas beyond the first vehicle in some aspects.

Figure 11:
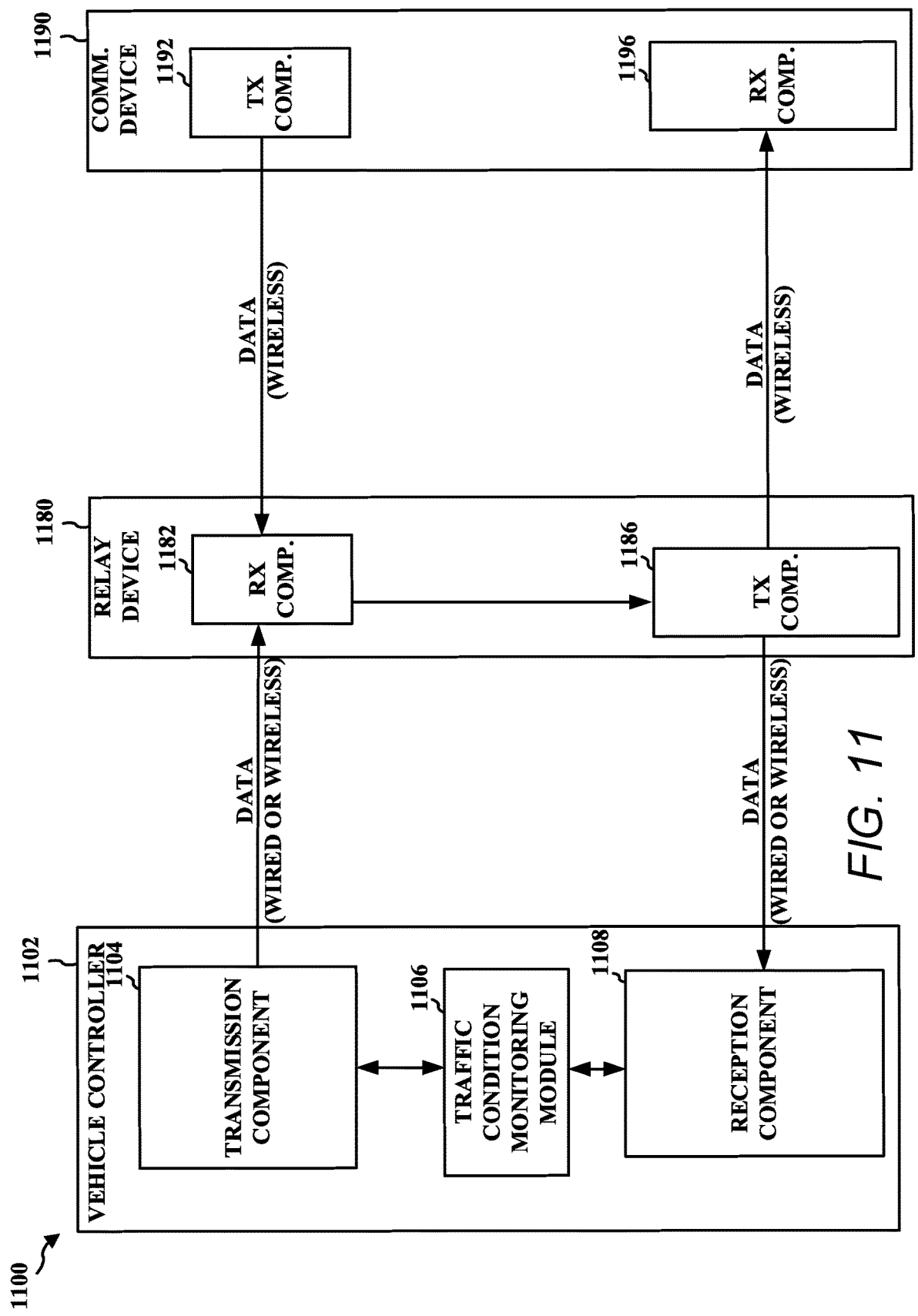
FIG. 11 is a conceptual data flow diagram illustrating the data flow between different means/components in exemplary apparatuses in accordance with an aspect of the disclosure.

FIG. 11 is a conceptual data flow diagram 1100 illustrating the data flow between different means/components in exemplary apparatuses 1102 and 1180 and 1190 in accordance with an aspect of the disclosure. The apparatus 1102 may be a vehicle controller (e.g., vehicle controller 500) in communication with an apparatus 1180, which may be a relay device (e.g., relay device 600), in communication with a communications device 1190, which may be a UE such as UE 302, or a vehicle sensor such as a camera, etc.

The apparatus 1102 includes a transmission component 1104, which may correspond to wired communications interface 510, wireless communications interface 520, or both. The apparatus 1102 further includes a traffic condition monitoring module 1106, which may correspond to processor circuitry in the vehicle controller 500. The apparatus 1102 further includes a reception component 1108, which may correspond to wired communications interface 510, wireless communications interface 520, or both.

The apparatus 1180 includes a reception component 1182, which may correspond to wired communications interface 610, wireless communications interface 620, or both. The apparatus 1186 further includes a transmission component 1186, which may correspond to wired communications interface 610, wireless communications interface 620, or both.

The apparatus 1190 includes a transmission component 1192, which may correspond to a wireless communications interface (e.g., transmitter 324, etc.). The apparatus 1196 further includes a reception component 1196, which may correspond to a wireless communications interface (e.g., receiver 322, etc.).

Referring to FIG. 11, the traffic condition monitoring module 1106 has transitioned to a first mode of operation whereby communications with the apparatus 1190 are mediated via the apparatus 1180. Accordingly, data is transmitted from transmission component 1104 to reception component 1182 over a wired or wireless connection, after which the data is relayed by the transmission component 1186 to the reception component 1196 via a wireless connection. In the other direction, data is transmitted from transmission component 1192 to reception component 1182 over a wireless connection, after which the data is relayed by the transmission component 1186 to the reception component 1108 via a wired or wireless connection.

One or more components of the apparatus 1102 may perform each of the blocks of the algorithm in the aforementioned flowcharts of FIG. 10. As such, each block in the aforementioned flowcharts of FIG. 10 may be performed by a component and the apparatus 1102 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
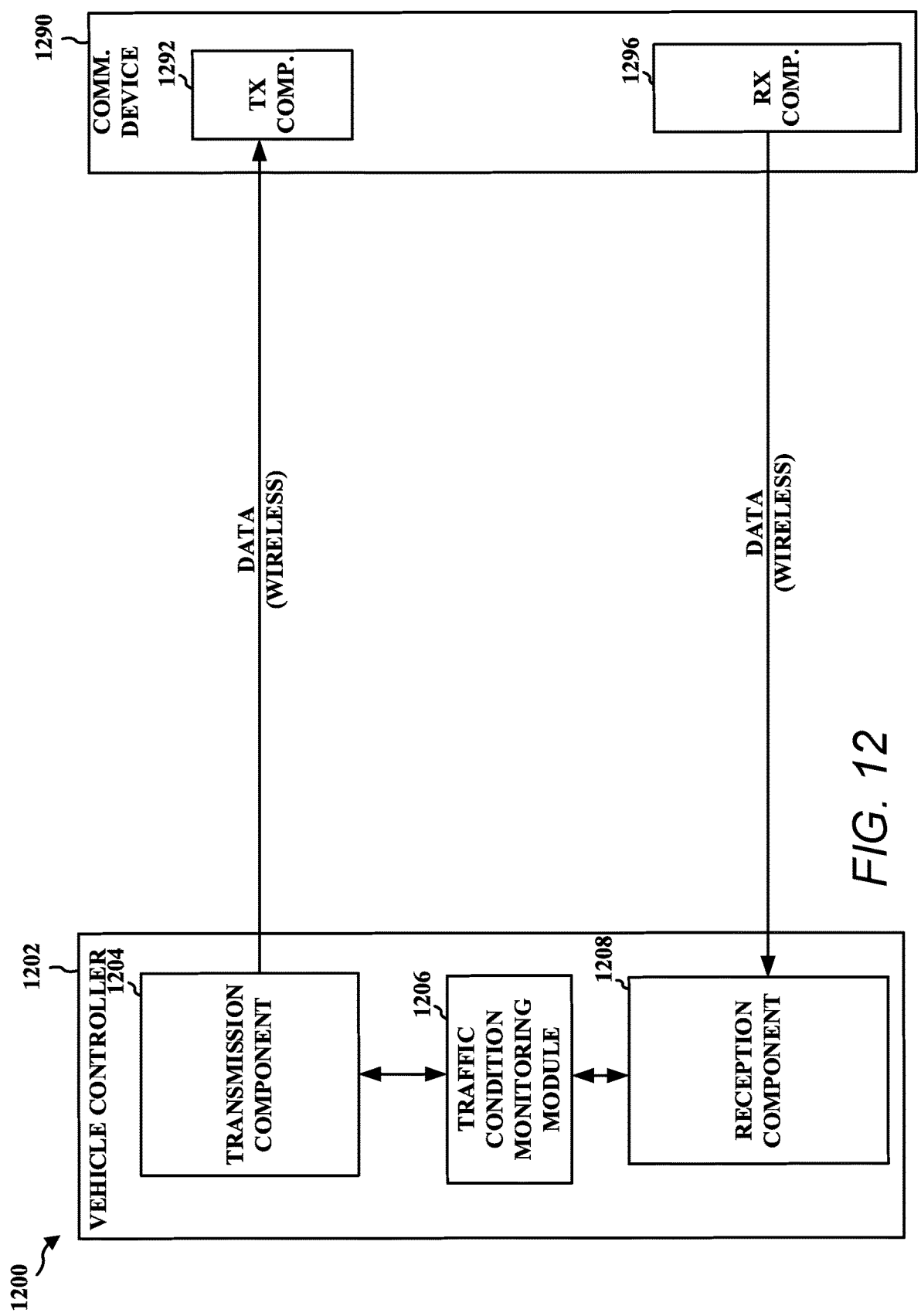
FIG. 12 is a conceptual data flow diagram illustrating the data flow between different means/components in exemplary apparatuses in accordance with another aspect of the disclosure.

FIG. 12 is a conceptual data flow diagram 1200 illustrating the data flow between different means/components in exemplary apparatuses 1202 and 1290 in accordance with an aspect of the disclosure. The apparatus 1202 may be a vehicle controller (e.g., vehicle controller 500) in communication with a communications device 1290, which may be a UE such as UE 302, or a vehicle sensor such as a camera, etc.

The apparatus 1202 includes a transmission component 1204, which may correspond to wireless communications interface 520. The apparatus 1202 further includes a traffic condition monitoring module 1206, which may correspond to processor circuitry in the vehicle controller 500. The apparatus 1202 further includes a reception component 1208, which may correspond to wireless communications interface 520.

The apparatus 1290 includes a transmission component 1292, which may correspond to a wireless communications interface (e.g., transmitter 324, etc.). The apparatus 1290 further includes a reception component 1296, which may correspond to a wireless communications interface (e.g., receiver 322, etc.).

Referring to FIG. 12, the traffic condition monitoring module 1206 has transitioned to a second mode of operation whereby at least some of the communications with the apparatus 1290 are direct (by passing via the apparatus 1180, although partial deactivation of the relays is also possible in the first mode of operation as noted above). Accordingly, data is transmitted from transmission component 1204 to reception component 1296 over a direct wireless connection. In the other direction, data is transmitted from transmission component 1292 to reception component 1208 over a direct wireless connection.

One or more components of the apparatus 1202 may perform each of the blocks of the algorithm in the aforementioned flowcharts of FIG. 10. As such, each block in the aforementioned flowcharts of FIG. 10 may be performed by a component and the apparatus 1202 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
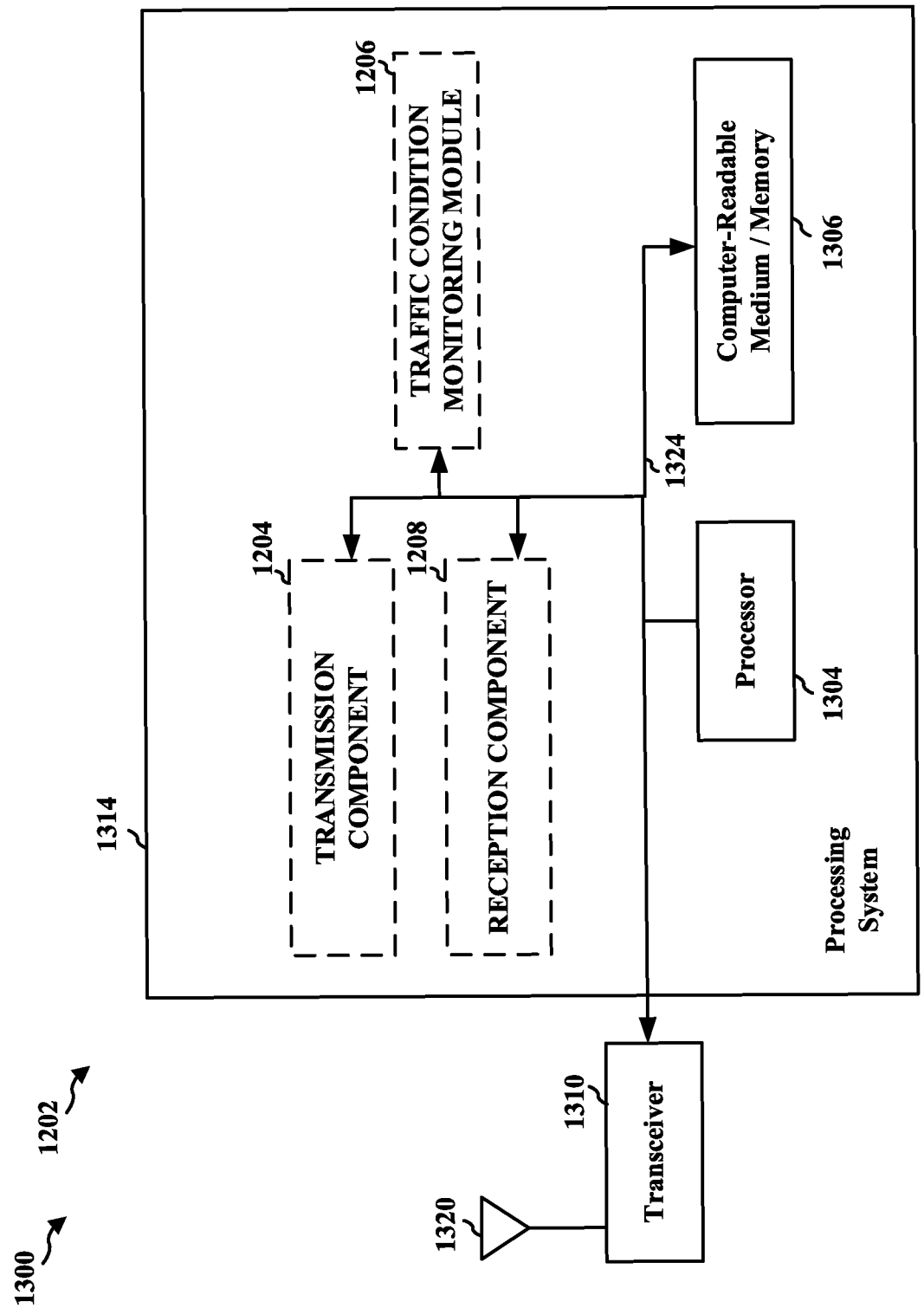
FIG. 13 is a diagram illustrating an example of a hardware implementation for an apparatus employing a processing system.

FIG. 13 is a diagram 1300 illustrating an example of a hardware implementation for an apparatus 1202 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206 and 1208, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1208. In addition, the transceiver 1310 receives information from the processing system 1314, specifically the transmission component 1204, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206 and 1208. The components may be software components running in the processor 1304, resident/stored in the computer readable medium/memory 1306, one or more hardware components coupled to the processor 1304, or some combination thereof. The processing system 1314 may be a component of the vehicle controller 500.

In one configuration, the apparatus 1202 (e.g., a vehicle controller) may comprise means for monitoring a traffic condition associated with a vehicle, and means for transitioning between a first mode of operation and a second mode of operation based on the monitored traffic condition, wherein, during the first mode of operation, a set of relay devices is at least partially activated so as to provide wireless coverage some or all of a plurality of vehicle regions while a wireless communications interface of the vehicle controller is at least partially deactivated so as to provide wireless coverage in less than all of the plurality of vehicle regions; and wherein, during the second mode of operation, the set of relay devices is deactivated while the wireless communications interface of the vehicle controller is activated so as to provide wireless coverage in the plurality of vehicle regions.

The aforementioned means may be one or more of the aforementioned components of the apparatus 1202 and/or the processing system 1314 of the apparatus 1202 configured to perform the functions recited by the aforementioned means.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A vehicle communications system of a vehicle, comprising:
 a vehicle controller comprising a wireless communications interface capable of providing wireless coverage in a plurality of vehicle regions of an in-vehicle network;
 and a set of relay devices that are each communicatively coupled to the vehicle controller and are each capable of providing wireless coverage in at least one of the plurality of vehicle regions of the in-vehicle network,
 wherein, during a first mode of operation, the wireless communications interface of the vehicle controller is at least partially deactivated so as to provide wireless coverage in less than all of the plurality of vehicle regions while at least one relay device in the set of relay devices is activated so as to provide wireless coverage in a subset of the plurality of vehicle regions, and
 wherein, during a second mode of operation, the wireless communications interface of the vehicle controller is activated to provide wireless coverage in the plurality of vehicle regions while each relay device in the set of relay devices is deactivated.

2. The vehicle communications system of claim 1, wherein the set of relay devices comprises a single relay device that is capable of providing wireless coverage in a single vehicle region.

3. The vehicle communications system of claim 1, wherein the set of relay devices comprises a plurality of relay devices that are each capable of providing wireless coverage in a different vehicle region.

4. The vehicle communications system of claim 1, wherein, during the first mode of operation, the wireless communications interface of the vehicle controller is partially deactivated so as to provide wireless coverage in one of the plurality of vehicle regions, or wherein, during the first mode of operation, the wireless communications interface of the vehicle controller is fully deactivated.

5. The vehicle communications system of claim 1, wherein, during the first mode of operation, the at least one relay device is configured to directly exchange wireless data with a set of communication devices and to relay the exchanged wireless data to or from the vehicle controller via a set of communications links.

6. The vehicle communications system of claim 5,
wherein the set of communications links comprise one or more wired communications links, or
wherein the set of communications links comprise one or more wireless communications links, or
a combination thereof.

7. A method of operating a vehicle controller of a vehicle communications system of a first vehicle, comprising:
monitoring a traffic condition associated with the first vehicle; and
transitioning between a first mode of operation and a second mode of operation based on the monitored traffic condition,
wherein, during the first mode of operation, a set of relay devices is at least partially activated so as to provide wireless coverage in some or all of a plurality of vehicle regions of an in-vehicle network while a wireless communications interface of the vehicle controller is at least partially deactivated so as to provide wireless coverage in less than all of the plurality of vehicle regions of the in-vehicle network; and
wherein, during the second mode of operation, the set of relay devices is deactivated while the wireless communications interface of the vehicle controller is activated so as to provide wireless coverage in the plurality of vehicle regions of the in-vehicle network.

8. The method of claim 7, wherein the traffic condition comprises wireless interference.

9. The method of claim 8,
wherein the first mode of operation is transitioned to the second mode of operation if the wireless interference is below a first interference threshold, and
wherein the second mode of operation is transitioned to the first mode of operation if the wireless interference is above a second interference threshold.

10. The method of claim 7, wherein the traffic condition comprises an interference source.

11. The method of claim 10, wherein the interference source is associated with a second vehicle, a pedestrian user equipment (PUE), or a roadside unit (RSU).

12. The method of claim 10,
wherein the first mode of operation is transitioned to the second mode of operation if the interference source is detected within a first threshold distance of the first vehicle, and
wherein the second mode of operation is transitioned to the first mode of operation if the interference source is not detected within a first threshold distance of the first vehicle.

13. The method of claim 10, wherein the interference source is monitored based on an interference measurement, sensor-based detection of the interference source, a direct communications link established with the interference source, or a combination thereof.

14. The method of claim 7, wherein the set of relay devices comprises a single relay device that is capable of providing wireless coverage in a single vehicle region.

15. The method of claim 7, wherein the set of relay devices comprises a plurality of relay devices that are each capable of providing wireless coverage in a respective vehicle region.

16. The method of claim 15, wherein, during the first mode of operation, each of the plurality of relay devices is activated.

17. The method of claim 15, wherein, during the first mode of operation, a first subset of the plurality of relay devices is activated and a second subset of the plurality of relay devices is deactivated.

18. The method of claim 17,
wherein the first subset of relay devices is associated with a first subset of the plurality of vehicle regions,
wherein the second subset of relay devices is associated with a second subset of the plurality of vehicle regions, and
wherein, relative to the second subset of vehicle regions, the first subset of vehicle regions is associated with a higher level of interference, closer proximity to an interference source, or both.

19. The method of claim 7, further comprising:
during the first mode of operation, relaying data between the vehicle controller and at least one relay device via a set of communication links, the relayed data further being directly wirelessly exchanged between the at least one relay device and a set of communications devices.

20. The method of claim 19,
wherein the set of communications links comprise one or more wired communications links, or
wherein the set of communications links comprise one or more wireless communications links, or
a combination thereof.

21. The method of claim 7, further comprising:
during the second mode of operation, exchanging wireless signals directly with a set of communications devices in any of the plurality of vehicle regions.

22. A vehicle controller of a vehicle communications system of a vehicle, comprising:
means for monitoring a traffic condition associated with the vehicle; and
means for transitioning between a first mode of operation and a second mode of operation based on the monitored traffic condition,
wherein, during the first mode of operation, a set of relay devices is at least partially activated so as to provide wireless coverage in some or all of a plurality of vehicle regions of an in-vehicle network while a wireless communications interface of the vehicle controller is at least partially deactivated so as to provide wireless coverage in less than all of the plurality of vehicle regions of the in-vehicle network; and wherein, during the second mode of operation, the set of relay devices is deactivated while the wireless communications interface of the vehicle controller is activated so as to provide wireless coverage in the plurality of vehicle regions of the in-vehicle network.

23. The vehicle controller of claim 22, wherein the traffic condition comprises wireless interference, or wherein the traffic condition comprises an interference source.

24. The vehicle controller of claim 22, wherein the set of relay devices comprises a single relay device that is capable of providing wireless coverage in a single vehicle region.

25. The vehicle controller of claim 22, wherein the set of relay devices comprises a plurality of relay devices that are each capable of providing wireless coverage in a respective vehicle region.

26. A non-transitory computer-readable medium comprising instructions stored thereon which cause a vehicle controller of a vehicle communications system of a vehicle to:

monitor a traffic condition associated with the vehicle; and transition between a first mode of operation and a second mode of operation based on the monitored traffic condition, wherein, during the first mode of operation, a set of relay devices is at least partially activated so as to provide wireless coverage in some or all of a plurality of vehicle regions of an in-vehicle network while a wireless communications interface of the vehicle controller is at least partially deactivated so as to provide wireless coverage in less than all of the plurality of vehicle regions of the in-vehicle network; and wherein, during the second mode of operation, the set of relay devices is deactivated while the wireless communications interface of the vehicle controller is activated so as to provide wireless coverage in the plurality of vehicle regions of the in-vehicle network.

27. The non-transitory computer-readable medium of claim 26, wherein the traffic condition comprises wireless interference, or wherein the traffic condition comprises an interference source.

28. The non-transitory computer-readable medium of claim 26, wherein the set of relay devices comprises a single relay device that is capable of providing wireless coverage in a single vehicle region.

29. The non-transitory computer-readable medium of claim 26, wherein the set of relay devices comprises a plurality of relay devices that are each capable of providing wireless coverage in a respective vehicle region.

* * * * *